(12) United States Patent
Rosenoer

(10) Patent No.: US 11,991,299 B1
(45) Date of Patent: *May 21, 2024

(54) SYSTEMS AND METHODS FOR FACILITATING USE OF ARTIFICIAL INTELLIGENCE PLATFORMS TRAINED ON BLOCKCHAIN ACTION LINEAGES TO CONDUCT BLOCKCHAIN ACTIONS

(71) Applicant: Citibank, N.A., New York, NY (US)

(72) Inventor: Jonathan Miles Collin Rosenoer, Westport, CT (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,873

(22) Filed: Dec. 11, 2023

Related U.S. Application Data

(63) Continuation-in-part of application No. 18/361,507, filed on Jul. 28, 2023, now Pat. No. 11,842,287, which is a continuation-in-part of application No. 18/152,694, filed on Jan. 10, 2023, now Pat. No. 11,755,746.

(51) Int. Cl.
*H04L 9/00* (2022.01)
*H04L 9/08* (2006.01)

(52) U.S. Cl.
CPC . *H04L 9/50* (2022.05); *H04L 9/08* (2013.01)

(58) Field of Classification Search
None
See application file for complete search history.

(56) References Cited

U.S. PATENT DOCUMENTS

| | | | |
|---|---|---|---|
| 11,423,409 B2 * | 8/2022 | Arai | G06Q 20/389 |
| 2017/0140408 A1 * | 5/2017 | Wuehler | G06Q 30/0207 |
| 2020/0034469 A1 * | 1/2020 | Sato | G06F 16/1834 |
| 2020/0242595 A1 * | 7/2020 | Harrison | H04L 67/1097 |
| 2021/0357195 A1 * | 11/2021 | Zhu | H04L 9/3236 |

* cited by examiner

*Primary Examiner* — Fatoumata Traore
(74) *Attorney, Agent, or Firm* — Perkins Coie LLP

(57) ABSTRACT

Systems and methods are described herein for facilitating use of artificial intelligence platforms to generate network mappings for conducting blockchain actions. The system may access an internal index for an artificial intelligence platform, wherein the internal index comprises on-chain self-executing program characteristics and off-chain self-executing program characteristics and wherein the on-chain self-executing program characteristics and off-chain self-executing program characteristics are archived in the internal index based on respective temporal identifiers.

19 Claims, 7 Drawing Sheets

SYSTEMS AND METHODS FOR FACILITATING USE OF ARTIFICIAL INTELLIGENCE PLATFORMS TRAINED ON BLOCKCHAIN ACTION LINEAGES TO CONDUCT BLOCKCHAIN ACTIONS

CROSS-REFERENCE TO RELATED APPLICATION(S)

This application is a continuation-in-part of U.S. patent application Ser. No. 18/361,507, filed Jul. 28, 2023, which is a continuation-in-part of U.S. patent application Ser. No. 18/152,694, filed Jan. 10, 2023. The content of the foregoing application is incorporated herein in its entirety by reference.

BACKGROUND

A blockchain is a decentralized ledger of transactions built upon a combination of cryptography techniques (e.g., secret keys, hash functions, etc.), consensus mechanisms (e.g., proof-of-work, proof-of-stake, etc.), and computer networks (e.g., peer-to-peer (P2P) networks, the internet, etc.). The blockchain stores information electronically, grouped together into a series of subsets of the information called "blocks." The information may be maintained by a network of computers using cryptography and consensus mechanisms, which make the records difficult to hack or alter. Specifically, the integrity of the information in each block may be maintained through one-way cryptographic functions that make the information immutable for practical purposes.

As blocks of information are added, the various blocks form a chain, which represents an immutable record of all the previous transactions across the network. Given the immutability of the records, the public availability of the information in the blockchain, and the reliance on consensus mechanisms for adding new blocks, the blockchain does not require a central authority to monitor transactions, maintain records, and/or enforce rules. As such, blockchains and blockchain technology has become a foundation of many decentralized applications.

Blockchain technology has also led to the development and rise in popularity of self-executing programs (e.g., smart contracts). Self-executing programs comprise a program in which rules for execution are written into lines of code. The code and the rules contained therein may then exist across a distributed, decentralized blockchain network. For example, a self-executing program may comprise a contract in which the terms of the agreement between buyer and seller are written into lines of code. Furthermore, the program may be executed automatically in response to detecting that certain conditions are met. These conditions may be based on the blockchain network, another self-executing program, and/or an application that connects the blockchain network to one or more external systems (e.g., an oracle).

SUMMARY

Despite the technological breakthrough that blockchain and blockchain technology represent, practical implementations of blockchain technology have been hindered by several technical problems. For example, the predetermined conditions and resulting actions from the execution of the self-executing programs are, in fact, encoded into them and cannot be changed after they are published to a blockchain. This raises serious security concerns because they can then be analyzed for flaws to be used for malicious attacks. These security concerns, in turn, present challenges to integrating blockchain technology into traditional, centralized software infrastructures.

Furthermore, public, non-permissioned networks may allow any user to publish a self-executing program. This means that unknown third parties can install self-executing programs that execute on all network nodes without explicit permission of any first party node owner. These self-executing programs permanently reside on the blockchain and cannot be changed or deleted. Even if the third party is known, it is not generally known by the first party node owner who, in fact, coded the self-executing program and whether the code is fit for its purpose. This is a particular concern because, due to the relative newness of blockchains and associated tools, self-executing programs can be hard to code and debug prior to installation.

As such, users attempting to use self-executing programs or rely on the execution of self-executing programs face significant uncertainty regarding the state of the self-executing programs and/or any characteristics of those self-executing programs. To overcome these technical deficiencies in existing systems, systems and methods are disclosed herein for mapping networks in order to facilitate the blockchain actions across the network using artificial intelligence models. To map the applications on a computer network, the artificial intelligence model may first need to identify all self-executing programs (e.g., smart contracts), associated self-executing programs, and other applications (e.g., oracles, network bridges, linked databases, decentralized systems) running on or on top of the network, along with their specific requirements and characteristics. This could involve conducting a network assessment or inventory to identify all the devices and systems connected to the network, as well as the applications and services running on those devices.

Having mapped the network design and configuration, the system may constrain the ability of network users only to use self-executing programs and other applications that are compliant with the predetermined criteria. By doing so, the system optimizes usage of the network based on the needs of individual users, such as protection of sensitive data (e.g., using zero knowledge proofs, homomorphic encryption, etc.). Additionally or alternatively, the system may ensure that the mapping and requirements enforcement is reliable and efficient and may identify any potential issues or problems. That is, the system may provide recommendations for both conducting blockchain actions on a network and also recommendations on the most efficient and/or beneficial manner in which to conduct those actions.

However, the use of an artificial intelligence model to perform this mapping faces numerous technical challenges. First, training artificial intelligence models often requires access to large, diverse, and high-quality datasets. However, blockchains are primarily designed for storing transactional data and may not comprise the large datasets (e.g., comprising self-executing program characteristics such as self-executing program requirements, network connections, etc.) needed to adequately train artificial intelligence models. Second, blockchains rely on consensus mechanisms to ensure the validity and integrity of the data. However, achieving consensus among multiple participants can introduce latency, which is detrimental to the real-time requirements of artificial intelligence model training. The delay in reaching consensus and confirming transactions can significantly slow down the training process and make it impractical for training artificial intelligence models.

In view of these technical challenges, the systems and methods recite the use of an artificial intelligence platform that is trained on blockchain action lineages in order to conduct blockchain actions. For example, given the technical hurdles discussed above related to a lack of high-quality datasets and latency, the system generates its own training data. Furthermore, the training data may be stored off-chain in order to resolve potential latency issues. However, as opposed to training data on conventional blockchain data (e.g., transactional data), which, as described above, may be too limited for proper training, the system may rely on blockchain action lineages that are derived from the previously described network map. The blockchain action lineages may indicate self-executing program characteristics corresponding to each self-executing program of a plurality of self-executing programs used to conduct one or more blockchain actions. For example, not only may the system train the artificial intelligence platform on the self-executing program characteristics on the mapped network, but the system may also identify and/or map one or more blockchain action characteristics of blockchain actions conducted over the mapped network. By doing so, the system may provide recommendations for both conducting blockchain actions on a network and also recommendations on the most efficient and/or beneficial manner in which to conduct those actions.

In some embodiments, the systems may maintain an internal index for training the artificial intelligence model to map and facilitate actions across a blockchain network. The internal index may be annotated to record self-executing program characteristics detected on-chain as well as additional self-executing program characteristics and self-executing program requirements detected off-chain. The internal index may also include data read from databases and logs, including blocks, state databases, transaction receipts, log entries, and/or archive nodes. By using the internal index that includes both on-chain and off-chain self-executing program characteristics, the artificial intelligence model mitigates the lack of large datasets to adequately train artificial intelligence models. However, the use of the internal index does not resolve the issue of latency in the training process. For example, latency in updating the internal index may cause the same issues as latency on the blockchain itself. Accordingly, the internal index also archives the on-chain and off-chain self-executing program characteristics based on a temporal identifier (e.g., a timestamp) at which the on-chain and off-chain self-executing program characteristics were collected. The artificial intelligence model may then ingest this temporal identifier along with the on-chain and off-chain self-executing program characteristics themselves. The artificial intelligence model may then use the temporal identifiers to account for latency in collection (e.g., adjusting confidence metrics, model parameters, and/or model weights) based on the temporal identifiers. By doing so, the systems and methods account for the potential latency in on-chain and off-chain data.

In some aspects, systems and methods are described for facilitating use of artificial intelligence platforms trained on blockchain action lineages to conduct blockchain actions. The system may receive a first self-executing program requirement for a requested blockchain action across a first network. The system may determine a first feature input based on the first self-executing program requirement and the requested blockchain action. The system may input the first feature input into an artificial intelligence model to generate a first output, wherein the artificial intelligence model is trained to generate predictions for performing blockchain actions on the first network by adjusting weights of the artificial intelligence model according to a first subset of blockchain action lineages used to conduct a first subset of blockchain actions, wherein the first subset of blockchain action lineages indicates self-executing program characteristics corresponding to each self-executing program of a first plurality of self-executing programs used to conduct one or more of the first subset of blockchain actions. The system may perform the requested blockchain action based on the first output.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
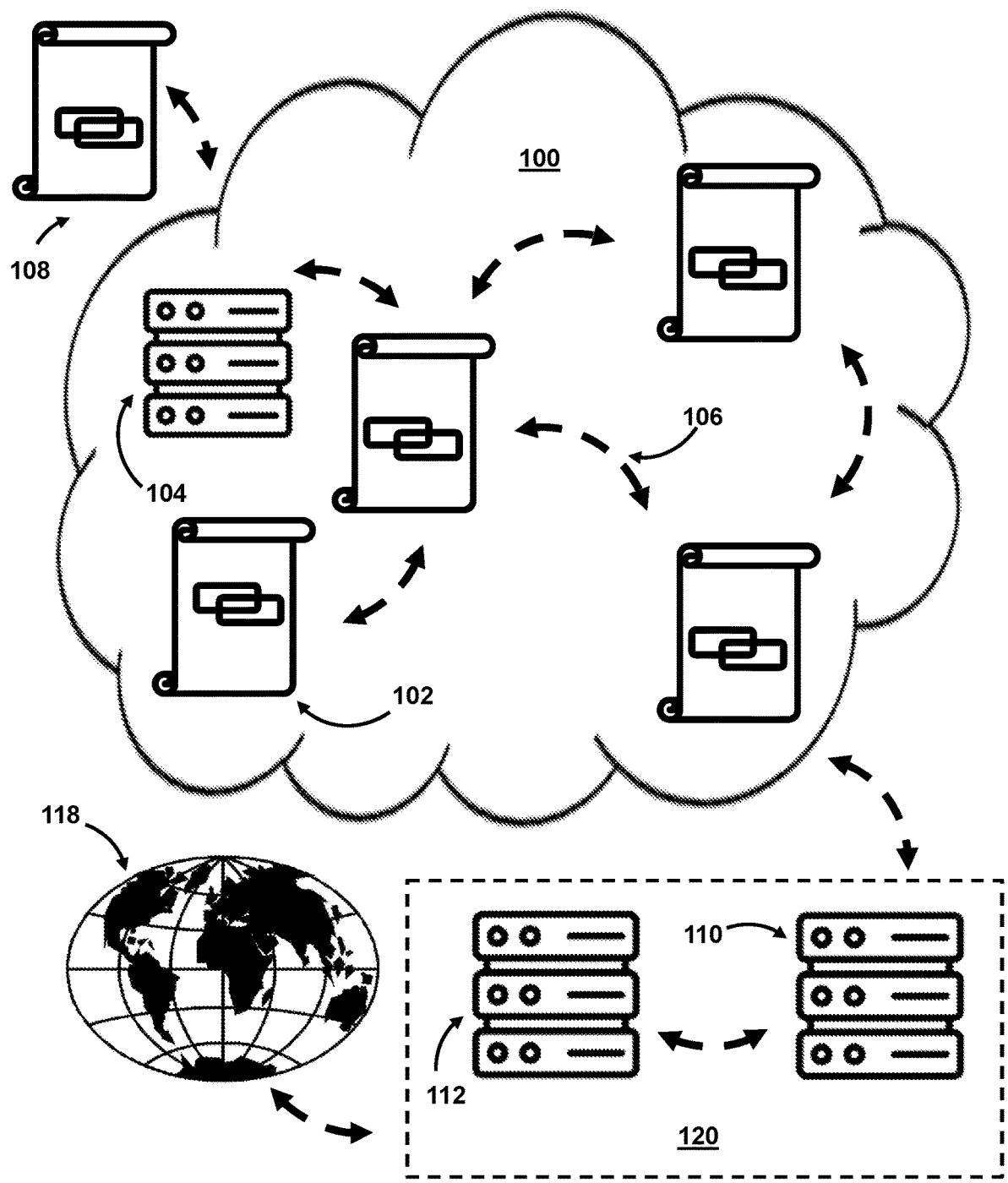
FIG. 1 shows an illustrative diagram for generating network mappings of self-executing program characteristics, in accordance with one or more embodiments.

FIG. 1 shows an illustrative diagram for generating network mappings of self-executing program characteristics, in accordance with one or more embodiments. For example, the system may include network 100, which may be a blockchain network. The system may iterate through and/or index all self-executing programs (e.g., smart contracts), associated self-executing programs, and/or other applications (e.g., oracles, network bridges, linked databases, DeFi systems) running on or on top of a blockchain network. For example, system 110 may iterate through self-executing program 102 and oracle 104. Additionally, FIG. 1 may include a self-executing program that is external to the network (e.g., self-executing program 108) as well as the relationships between various on-network and off-network connections. It should be noted that in some embodiments, network 100 may comprise multiple networks with different characteristics.

As referred to herein, a "blockchain action" may comprise any action including and/or related to blockchains and blockchain technology. For example, blockchain actions may include conducting transactions, querying a distributed ledger, generating additional blocks for a blockchain, transmitting communications-related non-fungible tokens (NFTs), performing encryption/decryption, exchanging public/private keys, and/or other actions related to blockchains and blockchain technology. In some embodiments, a blockchain action may comprise the creation, modification, detection, and/or execution of a self-executing program or program stored on a blockchain. For example, a self-executing program may comprise a program stored on a blockchain that is executed (e.g., automatically and/or without any intermediary's involvement or time loss) when one or more predetermined conditions are met. In some embodiments, a blockchain action may comprise the creation, modification, exchange, and/or review of a token (e.g., a digital blockchain-specific asset), including an NFT. An NFT may comprise a token that is associated with a good, a service, a self-executing program, and/or other content that may be verified by, and stored using, blockchain technology. In some embodiments, blockchain actions may also comprise actions related to mechanisms that facilitate other blockchain actions (e.g., actions related to metering activities for blockchain actions on a given blockchain network).

When doing so, the system may not only identify and/or label each self-executing program in the first plurality of self-executing programs, but the system may also identify and/or label the relationships between each self-executing program in the first plurality of self-executing programs. By doing so, the system may use these relationships in order to perform blockchain actions that require coordination (e.g., serial processing, parallel processing, etc.) between self-executing programs as well as determine potential options (e.g., which one or more self-executing programs to use) to perform a blockchain action. The system may also identify the characteristics of each self-executing program in the first plurality of self-executing programs. By doing so, the system may filter between and/or select a self-executing program in the first plurality of self-executing programs that meets predetermined requirements. In some embodiments, the self-executing program characteristic may include an off-chain self-executing program characteristic (e.g., corresponding to off-chain data) and/or an on-chain self-executing program characteristic (e.g., corresponding to on-chain data).

The system may further identify blockchain action lineages. Blockchain action lineage may refer to the chronological order or sequence of blockchain actions that have taken place on a blockchain network. The blockchain action lineage may represent the history of operations or events in the blockchain network, showing the sequence of actions (e.g., what self-executing programs were used), the blockchain action characteristics (such as sender, receiver, amount, timestamp, etc.), the self-executing program characteristics, and how they are linked together in a continuous and immutable chain to conduct blockchain actions. This lineage may ensure transparency and accessibility to information about blockchain actions and the self-executing programs used to conduct them. Using the blockchain action lineages, the system may verify the validity of blockchain actions meeting one or more blockchain action requirements (e.g., tracking the flow of assets, ensuring security, and/or maintaining the integrity of the entire network) and/or make recommendations related to the blockchain actions (e.g., the locations on the network used, the series of network connections used to access the location, a digital asset corresponding to the blockchain action, etc.).

To generate the blockchain action lineage, the system may monitor for self-executing program code as it is deployed onto the blockchain network. This deployment may create a unique address associated with that particular self-executing program, which may be mapped by the system. As users interact with these self-executing programs by triggering actions, such as sending transactions that execute specific functions within a contract, the system may also monitor these actions (e.g., monitor the transferring of tokens, the updating data, and/or trigger other contract-specific functionalities). Each blockchain action involving a self-executing program is logged and recorded by the system. These actions are typically recorded in an index along with relevant details such as timestamp (e.g., a temporal identifier), sender, receiver, amount, and the specific function or method invoked within the self-executing program. Using the index, the system maintains a chronological record of all these blockchain actions. The blockchain action lineage is thus the sequence of these actions, each linked to the previous one, forming a continuous chain of events, along with one or more relevant blockchain action characteristics and/or self-executing program characteristics.

For example, alongside the blockchain actions, the self-executing program characteristics such as its address, code, functions, parameters, and relevant metadata are stored by the system. These details are associated with the specific blockchain actions (and characteristics thereof) executed by that self-executing program. The system (or users, applications, artificial intelligence platforms, etc.) may query the blockchain to retrieve the blockchain action lineage associated with a particular self-executing program, blockchain action, etc.

For example, the system (e.g., via the index) indexes may record relationships between blockchain actions, blockchain action characteristics, self-executing programs, and/or self-executing program characteristics. Indexes in the system may use various data structures like hash tables, B-trees, or other forms of organized data structures. These structures help in organizing and optimizing the search and retrieval of information. Each self-executing program that is deployed on a blockchain may have a unique address. The system (e.g., the index) can store these addresses as keys and associate them with various attributes or characteristics of the contract, such as the code, state variables, or methods/functions within the contract. The system (e.g., the index) can record event logs generated by smart contracts. These logs contain valuable information about blockchain actions, interactions, and/or specific operations performed within the self-executing program. The system (e.g., the index) can link transaction data to these logs, allowing for a traceable history of blockchain actions executed by the self-executing program. The system (e.g., the index) may also map specific parameters or inputs used in transactions to the associated characteristics within a self-executing program. For instance, if a transaction involves a particular function call within a self-executing program, the index can map this transaction to the function's characteristics, such as its name, inputs, outputs, and execution status. The system (e.g., the index) may be optimized for quick retrieval and searching of information. By efficiently organizing and linking data, indexes enable faster access to specific actions, functions, or characteristics within self-executing programs, improving the overall performance of blockchain systems. The system (e.g., the index) can also be used to track the state of the blockchain. It can maintain pointers to the latest state of smart contracts, their storage variables, or other relevant data, facilitating quick access to the current state without requiring extensive traversal of the entire blockchain.

As such, users attempting to use self-executing programs or rely on the execution of self-executing programs face significant uncertainty regarding the state of the self-executing programs and/or any characteristics of those self-executing programs. To overcome these technical deficiencies in existing systems, systems and methods are disclosed herein for mapping networks in order to facilitate the blockchain actions across the network, but also to facilitate the use of self-executing programs and the integration of self-executing programs with traditional infrastructure.

Mapping a network according to application security and regulatory compliance characteristics means organizing and configuring the network in a way that meets both security and compliance requirements for the specific applications it will be used for. This typically involves identifying the security risks and vulnerabilities associated with each application, as well as the regulatory requirements that apply to the data and systems the network will be handling. The network can then be designed and configured to address both sets of requirements, ensuring that it is able to provide robust security and comply with relevant regulations. This may involve implementing security controls such as access controls and encryption, as well as adhering to specific industry or government standards for data handling and security. The goal is to ensure that the network is able to support the applications it will be used for in a secure and compliant manner To map the applications on a computer network, a system may first need to identify all self-executing programs (e.g., smart contracts), associated self-executing programs, and other applications (e.g., oracles, network bridges, linked databases, decentralized systems) running on or on top of the network, along with their specific requirements and characteristics. This could involve conducting a network assessment or inventory to identify all the devices and systems connected to the network, as well as the applications and services running on those devices.

As such, any entity (e.g., a legacy computing system and/or another self-executing program) that requests access to a self-executing program may first receive information about a characteristic of the self-executing program, such as the status of its validation (if any). For example, the network mapping may provide information related to subjects such as functionality verification (e.g., formal verification), performance optimization and minimization of network resource usage, potential security vulnerabilities, and lack of trustworthy data feeds (e.g., security, data correctness). As the request is interfacing with the network mapping as opposed to the underlying self-executing program, the request does not run the risk of corruption and/or other unexpected behaviors by accessing the code of the self-executing program directly. Accordingly, any entity wishing to access self-executing programs on a blockchain may first interface with the network mapping to determine a risk associated with the underlying self-executing program. By doing so, the entity may receive an output from the network mapping indicating a particular validation method, validation protocol, and/or source of the self-executing program or its underlying code.

Once a complete inventory is obtained, the system may then evaluate each one in terms of particular requirements (e.g., compliance, security, etc.). As such, the system may determine specific configuration and attributes of each application, device, and program, and identify any potential conflicts with predetermined criteria (e.g., compliance, security, etc.) or compatibility issues.

Having mapped the network design and configuration, the system may constrain the ability of network users only to use self-executing programs and other applications that are compliant with the predetermined criteria. By doing so, the system optimizes usage of the network given particular user needs, such as protection of sensitive data (e.g., using zero knowledge proofs, homomorphic encryption, etc.). Additionally or alternatively, the system may ensure that the mapping and requirements enforcement is reliable and efficient and may identify any potential issues or problems. That is, the system may provide recommendation for both conduction actions on a network and also recommendations on the most efficient and/or beneficial manner in which to conduct those actions.

Additionally or alternatively, the system may constrain (or recommend) the ability of network users only to perform particular blockchain actions (or blockchain actions comprising specific blockchain action characteristics). For example, the system may determine, based on the mapping, a first subset of blockchain action lineages used to conduct a first subset of blockchain actions, wherein the first subset of blockchain action lineages indicates self-executing program characteristics corresponding to each self-executing program of a first plurality of self-executing programs used to conduct one or more of the first subset of blockchain actions.

For example, system 110 may receive a first user request to generate a mapping of a first network, wherein the mapping indicates self-executing program characteristics corresponding to each self-executing program of a first plurality of self-executing programs. For example, the system may receive a request to generate a map or index of all self-executing programs (e.g., smart contracts) and associated self-executing programs, and/or other applications (e.g., oracles, network bridges, linked databases, DeFi (decentralized finance) systems) running on or on top of network 100.

Furthermore, the system may identify specific self-executing program characteristics. As described herein, a "self-executing program characteristic" may comprise any characteristic of a program, self-executing program, and/or combination thereof (including its underlying code) that distinguishes it from another program, self-executing program, and/or combination thereof (including its underlying code). For example, a self-executing program characteristic may comprise a security certificate, a specific code origination identifier, a specific program validator, a specific digital asset, a specific signing procedure, a number of signatures, and/or other characteristics described herein. Similarly, as described herein, a "blockchain action characteristic" may comprise any characteristic of a blockchain action that distinguishes it from another blockchain action.

In some aspects, systems and methods are disclosed herein for generating network mappings of self-executing program characteristics. For example, the system may receive a first user request to generate a mapping of a first network, wherein the mapping indicates self-executing program characteristics corresponding to each self-executing program of a first plurality of self-executing programs. In response to the first user request, the system may query the first plurality of self-executing programs to generate the mapping by identifying each self-executing program in the first plurality of self-executing programs, determining respective relationships between each self-executing program in the first plurality of self-executing programs and other self-executing programs in the first plurality of self-executing programs, and determining respective self-executing program characteristics for each self-executing program in the first plurality of self-executing programs. The system may store the mapping.

In some embodiments, a blockchain action may comprise identifying key lengths for quantum-resistant encryption by selecting algorithms with key sizes that can withstand attacks from quantum computers. For example, quantum computers have the potential to break many of the widely used encryption algorithms today, such as RSA and ECC (Elliptic Curve Cryptography). They can efficiently solve certain mathematical problems that form the basis of these algorithms, like integer factorization and discrete logarithms. Several cryptographic algorithms may be resistant to attacks by quantum computers. These include hash-based cryptography (e.g., SHA-3), lattice-based cryptography (e.g., NTRUEncrypt, LWE), code-based cryptography (e.g., McEliece), and multivariate polynomial cryptography (e.g., Rainbow). These algorithms rely on problems that are believed to be hard for both classical and quantum computers. The required key lengths for quantum-resistant algorithms can differ significantly from those used in traditional cryptography. In symmetric key algorithms (like AES), key lengths might need to be substantially increased. For asymmetric algorithms (like RSA, ECC), the key sizes needed for quantum resistance might be much larger compared to current standards. The system may choose key sizes with sufficient security margins to withstand potential advancements in quantum computing.

In some aspects, systems and methods are disclosed herein for conducting blockchain actions based on the network mappings. For example, the system may receive a mapping of a first network, wherein the mapping indicates self-executing program characteristics corresponding to each self-executing program of the first plurality of self-executing programs. The system may receive a first user request to perform a first blockchain action using the first network. The system may determine a first self-executing program requirement for the first user request. The system may determine, based on the mapping, a second plurality of self-executing programs corresponding to the first self-executing program requirement. The system may determine a third plurality of self-executing programs corresponding to the first blockchain action. The system may filter the third plurality of self-executing programs based on the second plurality of self-executing programs to generate a first subset of self-executing programs for performing the first blockchain action. The system may generate a first recommendation, on a first user device, for performing the first blockchain action using the first subset.

In some embodiments, a self-executing program characteristic may be compared against a "self-executing program requirement." For example, a required self-executing program characteristic may comprise a self-executing program characteristic required by a requesting entity in order for the requesting entity to use a self-executing program. For example, a self-executing program requirement may comprise a required security certificate, a required code origination identifier, a required program validator, a required digital asset, a required signing procedure, a required number of signatures, and/or other required characteristics described herein.

The use of the network mapping also provides additional technical benefits. Using the network mapping, the system may not only enforce requirements for particular security credentials/certificates but may also enforce other requirements on the underlying transaction. These other requirements may include obfuscating specific details related to the transaction from publication on the blockchain (e.g., to preserve privacy), providing additional execution requirements (e.g., based on know-your-customer protocols, government regulations, etc.), and/or providing additional functionality (e.g., generating supplemental notifications, triggering other transactions, etc.). For example, the system may add a specific privacy requirement that causes an interest rate in a transaction to be hidden, but still allows for the transaction itself to be validated and recorded on the blockchain. The system may accomplish this by encrypting the underlying self-executing program such that it is not public despite the self-executing program being published to the blockchain.

The use of the network mapping to conduct blockchain actions also provides yet additional technical benefit in that while it does not require a permissioned blockchain, it also does not require a layer two blockchain solution to achieve the aforementioned benefits. As such, the system is a layer one blockchain solution (e.g., an on-chain networking solution that may process and complete blockchain actions on its own blockchain) that works within existing protocols and does not require additional architecture on top of an existing blockchain. Accordingly, the system is highly flexible and scalable.

The system may also record the relationships between network entities. For example, the system may determine respective relationships between each self-executing program in the first plurality of self-executing programs and other self-executing programs in the first plurality of self-executing programs. For example, the system may record relationship 106 between the various entities in network 100. The system may generate a network map of the various relationships in order to determine network connections for performing blockchain actions.

In some embodiments, the system may further use one or more artificial intelligence models to generate a network map, determine network connections for performing blockchain actions, parse self-executing programs for self-executing program characteristics, and/or other activities for conducting blockchain actions based on network mappings of self-executing program characteristics.

System 110 also includes a model, which may be a machine learning model, artificial intelligence model, etc. (which may be referred collectively as "models" herein). The model may take inputs and provide outputs. The inputs may include multiple datasets, such as a training dataset and a test dataset. Each of the plurality of datasets may include data subsets related to user data, predicted forecasts and/or errors, and/or actual forecasts and/or errors. In some embodiments, outputs may be fed back to the model as input to train the model (e.g., alone or in conjunction with user indications of the accuracy of outputs, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., to generate a network map, determine network connections for performing blockchain actions, parse self-executing programs for self-executing program characteristics, and/or perform other activities for conducting blockchain actions based on network mappings of self-executing program characteristics).

In a variety of embodiments, the model may update its configurations (e.g., weights, biases, or other parameters) based on the assessment of its prediction (e.g., outputs) and reference feedback information (e.g., user indication of accuracy, reference labels, or other information). In a variety of embodiments where the model is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model may be trained to generate better predictions.

For example, the system may generate, based on one or more blockchain action lineages, training data for an artificial intelligence platform that is trained to generate predictions for performing blockchain actions on the first network by adjusting weights of the artificial intelligence platform according to the training data. Creating training data for an artificial intelligence platform that predicts blockchain actions based on blockchain action lineages may involve a multi-step process.

For example, the system may gather historical data from one or more blockchain networks about the blockchain action lineages. For example, the system may determine a first subset of blockchain action lineages used to conduct a first subset of blockchain actions, wherein the first subset of blockchain action lineages indicates self-executing program characteristics corresponding to each self-executing program of a first plurality of self-executing programs used to conduct one or more of the first subset of blockchain actions. This historical data may thus include information about past transactions, self-executing program interactions, block details, transaction parameters, sender/receiver addresses, timestamps, etc.

The system may then preprocess the collected data to clean, normalize, and/or structure it in a format suitable for training. This step might involve handling missing values, encoding categorical variables, and normalizing numerical data. The system may then perform feature engineering. For example, the system may extract relevant features from the blockchain action lineages. Features can include transaction patterns, self-executing program interactions, sequence of actions, transaction volumes, time-related patterns, etc. These features will serve as inputs for the model. The system may transform the extracted features into a format that the model can comprehend and learn from, such as numerical or categorical representations.

The system may then use the training data to generate predictions. For example, the system may define the prediction task. For instance, it could be predicting the success/failure of a transaction, detecting anomalies in transactions, forecasting gas fees, or predicting the next action in a sequence of actions. Based on the historical data and defined task, the system may generate labels or target values that the model will learn to predict. For example, if predicting transaction success, labels would indicate whether a past transaction was successful or not.

Utilizing machine learning or deep learning algorithms, such as neural networks, recurrent neural networks (RNNs), long short-term memory networks (LSTMs), or transformers, the system may build the AI model. For example, the system may feed the preprocessed features and corresponding labels into the model to train it. The model may adjust its internal parameters (weights) during training to minimize prediction errors and improve accuracy based on the provided training data. To adjust the parameters, the system may use gradient descent and backpropagation to update the model's weights iteratively during training By doing so, the model may learn from the relationships between input features and target labels within the training data, optimizing its predictive capabilities. The system may then assess the trained model's performance on validation or test datasets to evaluate its accuracy, precision, recall, or other relevant metrics. The system may then fine-tune the model by adjusting hyperparameters, modifying the network architecture, and/or incorporating additional features to enhance its predictive abilities.

The system may then deploy the trained model to make predictions for performing blockchain actions on the network. The model may use learned patterns and relationships from the training data (e.g., blockchain action lineages indicating self-executing program characteristics corresponding to each self-executing program of a plurality of self-executing programs used to conduct one or more blockchain actions) to predict outcomes or suggest optimal actions based on new input data. By generating training data from blockchain action lineages and training the model on this data, the system can leverage artificial intelligence to make predictions or decisions related to blockchain actions, allowing for automated and potentially more efficient operations within the blockchain network.

Network 100 may, in some embodiments, be included in artificial intelligence platform 120. An artificial intelligence platform, also known as an AI platform, may be a comprehensive software framework or ecosystem that provides a range of tools, libraries, and resources to develop, deploy, and manage artificial intelligence applications. It may serve as a foundation for building and running AI-based solutions, allowing developers and data scientists to leverage pre-built components, algorithms, and infrastructure to accelerate the development process.

Artificial intelligence platform 120 may include system 110. Artificial intelligence platform 120 may also include server 112. Server 112 may comprise an internal index of on-chain and off-chain data. The internal index may be annotated to record self-executing program characteristics detected on-chain as well as additional self-executing program and characteristics self-executing program requirements detected off-chain. By using the internal index that includes both on-chain and off-chain self-executing program characteristics, the artificial intelligence model mitigates the lack of large datasets to adequately train artificial intelligence models. For example, the system may access an internal index for an artificial intelligence platform, wherein the internal index comprises on-chain self-executing program characteristics and off-chain self-executing program characteristics, and wherein the on-chain self-executing program characteristics and off-chain self-executing program characteristics are archived in the internal index based on respective temporal identifiers.

However, the use of the internal index does not resolve the issue of latency in the training process. For example, latency in updating the internal index may cause the same issues as latency on the blockchain itself. Accordingly, the internal index also archives the on-chain and off-chain self-executing program characteristics based on a temporal identifier (e.g., a timestamp) at which the on-chain and off-chain self-executing program characteristics were collected. The artificial intelligence model may then ingest this temporal identifier along with the on-chain and off-chain self-executing program characteristics themselves. The artificial intelligence model may then use the temporal identifiers to account for latency in collection (e.g., adjusting confidence metrics, model parameters, and/or model weights) based on the temporal identifiers. By doing so, the systems and methods account for the potential latency in on-chain and off-chain data and enable real-time applications. To overcome latency in updating the internal index, the model may create a system snapshot and only update incrementally for changes and new data.

In some embodiments, the internal index may comprise a real-time trading system architecture. For example, the internal index may facilitate artificial intelligence platform 120 analyzing potential digital asset transaction paths for cost and time to finalize, including fee structure, native blockchain network and connected networks, transaction priority, blockchain network congestion, wallet settings that allow manual customization of transaction fees, digital asset type, i.e., cryptocurrency, NFT, finality approach, number of confirmations of block depth needed for confidence that transaction will not be invalidated, consensus mechanism used, block confirmation time, network security and overall computing power of participants, and/or network consensus rules.

In some embodiments, the system may generate the internal index with data archived with temporal identifiers. A temporal identifier may refer to a unique identifier or label that is associated with a specific point in time or a temporal event. The temporal identifier may help identify or distinguish temporal instances or occurrences within the internal index. Temporal identifiers can take various forms depending on the application or domain. For example, in one embodiment, a temporal identifier may be a timestamp, which represents a specific date and time when an event or data record occurred and/or was received. For example, timestamps may be used in databases, log files, and other systems of the internal index to order and organize events chronologically. In some cases, a temporal identifier may also include additional information such as time zones or time offsets to establish a precise reference point. This is particularly important when dealing with events or data that span multiple time zones or involve different geographic locations.

In some embodiments, the system may generate the internal index with data from on-chain and/or off-chain data. On-chain data may refer to the information that is recorded and stored directly on a blockchain. In a blockchain, data is organized into blocks, and each block contains a set of transactions or other pieces of information. The data within these blocks is considered on-chain data. On-chain data is typically transparent and immutable, meaning it is publicly accessible and cannot be altered or tampered with once it is recorded on the blockchain. This property is achieved through the consensus mechanism and cryptographic techniques employed by the blockchain network. On-chain data may include transaction details, such as sender and recipient addresses, transaction amounts, timestamps, and cryptographic signatures. It also includes smart contract code, which defines the rules and logic governing the execution of decentralized applications (DApps) or other programmable functionalities within the blockchain ecosystem.

Off-chain data may refer to information that is not stored directly on the blockchain but is instead stored or processed outside of the blockchain network. For example, off-chain data may be received from source 118. While the blockchain itself maintains the integrity and consensus of on-chain data, off-chain data exists separately and is referenced or utilized by the blockchain in various ways. Off-chain data can take different forms depending on the application or use case. For example, data may be stored in traditional databases or external systems that are not part of the blockchain network. These databases can store large amounts of information that might not be practical to store directly on the blockchain.

Off-chain data may be received via one or more oracles and/or state channels. Oracles are external entities or services that provide real-world data to the blockchain. Oracles act as bridges between the blockchain and off-chain data sources, retrieving information such as price feeds, weather data, or any other data required by smart contracts or DApps on the blockchain. State channels may be off-chain solutions that allow parties to conduct multiple transactions privately and quickly without recording each transaction on the blockchain. The final state of the transactions may then be settled on the blockchain, reducing transaction costs and increasing scalability. In some cases, computationally intensive tasks or complex calculations may be performed off-chain to reduce the burden on the blockchain network. The results or outcomes of these computations can be stored off-chain, with only the final result or proof of computation being recorded on the blockchain.

Artificial intelligence platform 120 may generate, based on the internal index, a mapping of a network. For example, the system may generate, based on the internal index, a mapping of a first network, wherein the mapping indicates self-executing program characteristics corresponding to each self-executing program of a first plurality of self-executing programs. For example, the Platform AI scans blockchain systems used for digital asset transactions and maps an inventory of their topology and componentry including, but not limited to, peers, smart contracts, oracles, and bridges. To create the mapping, artificial intelligence platform 120 may ingest historical information on digital asset transactions and create risk scoring of transactions and participating addresses and entities, evaluating using such further information as: market trends, such as trading volumes, market share, liquidity, mapping of transactions inputs and outputs and associated wallets, and transaction clustering patterns, third party analysis, illegal activities tracking, money laundering, and connections to darknet market, illicit fund transfers, identification of criminal, digital asset legal actions, digital asset performance, volatility, price momentum, correlation, seasonality, and/or evidence of potential market manipulation.

Artificial intelligence platform 120 may generate an output from a model (e.g., an artificial intelligence model). For example, the system may generate, based on a first self-executing program requirement and/or a first blockchain action, an output from an artificial intelligence model, wherein the artificial intelligence platform is trained to generate predictions for performing blockchain actions on the first network by adjusting weights of the artificial intelligence platform according to the respective temporal identifiers.

For example, the output may provide Next Best Action (NBA) notifications and alerts for potential digital asset arbitrage. In some embodiments, the output may comprise data analysis, predictive modeling, and/or real-time decision making. For example, artificial intelligence platform 120 may analyze universal digital asset point-in-time state to provide potential NBA for digital asset arbitrage. For example, each potential opportunity may be presented as a series of optimal paths (e.g., network connections) for transaction execution. In another example, each potential path is scored by taking into account factors such as cost, time to execute, and/or finality.

Artificial intelligence platform 120 may determine a plurality of self-executing programs for use in performing a blockchain action. For example, the system may, based on the output, determine a second plurality of self-executing programs for use in performing the first blockchain action.

In some embodiments, each potential path score may be enhanced with a risk and compliance score. For example, artificial intelligence may scan and map security, regulatory compliance, and other third party validations associated with potential transaction paths. Artificial intelligence may filter potential paths with risk management rules, including anti-money laundering, sanctions compliance, and anti-terrorist financing, local jurisdiction licensing rules (e.g., money transfer, securities), idiosyncratic counterparty risk management rules, and idiosyncratic credit, market, and operational risk management rules. Transactions above a particular score are whitelisted and available, and/or transactions below a particular score may be blacklisted and blocked.

In some embodiments, the system may access information about a self-executing program through one or more shell programs. It should be noted that the use of shell programs and other indicia for blockchain networks are described in U.S. patent application Ser. No. 18/063,052, "SYSTEMS AND METHODS FOR GENERATING SHELL-WRAPPED SELF-EXECUTING PROGRAMS FOR CONDUCTING CRYPTOGRAPHICALLY SECURE ACTIONS," as filed on Dec. 7, 2022, which is hereby incorporated by reference in its entirety. It should be noted that the use of virtual blockchain networks are described in U.S. patent application Ser. No. 18/062,090, "SYSTEMS AND METHODS FOR CONDUCTING CRYPTOGRAPHICALLY SECURE ACTIONS IN PUBLIC, NON-PERMISSIONED BLOCKCHAINS USING BIFURCATED SELF-EXECUTING PROGRAMS," as filed on Dec. 6, 2022, which is hereby incorporated by reference in its entirety.

Figure 2:
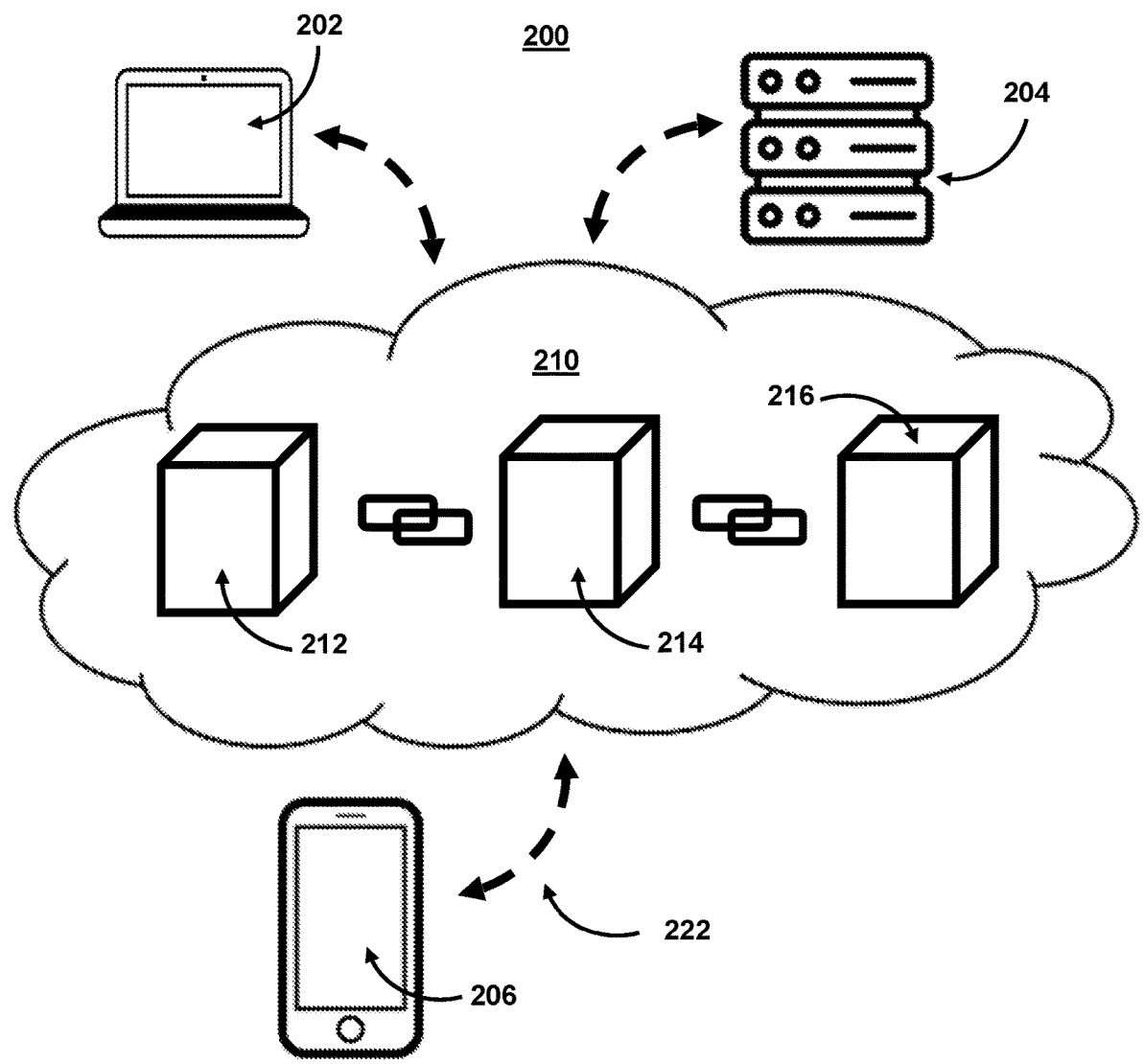
FIG. 2 shows an illustrative diagram of a blockchain network, in accordance with one or more embodiments.

FIG. 2 shows an illustrative diagram of a blockchain network, in accordance with one or more embodiments. For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by one or more client, which behaves like an actual computer) for the system. The data structure may comprise one or more devices and/or components, which may act in concert to facilitate blockchain 210.

As referred to herein, blockchain 210 may comprise a type of distributed ledger technology that consists of growing lists of records, called blocks (e.g., block 212, block 214, and block 216), that are securely linked together using cryptography. Each block may contain a cryptographic hash of the previous block (e.g., block 216 may contain a cryptographic hash of block 214), and that cryptographic hash may itself be based on a state of a preceding block (e.g., the cryptographic hash of block 216 is based not only on the state of block 214, but also block 212). For example, each block may include a timestamp and blockchain action data (e.g., represented as a Merkle tree, where data nodes are represented by leaves). The timestamp proves that the blockchain action data (e.g., the state of the block) existed when the block was created. As each block is based on information about the previous block, the blocks effectively form a chain with each additional block linking to the ones before it. Consequently, blockchain actions are irreversible in that, once they are recorded, the data in any given block cannot be altered retroactively without altering all subsequent blocks.

Blockchains are typically managed by a peer-to-peer (P2P) computer network for use as a public distributed ledger, where nodes collectively adhere to a consensus algorithm protocol to add and validate new transaction blocks. Although, in some embodiments, a blockchain may be managed by a private consortium of computers. While blockchain records are not unalterable, since blockchain forks are possible, blockchains may be considered secure by design and exemplify a distributed computing system with high Byzantine fault tolerance.

As shown in FIG. 2, system 200 comprises user device 202, user device 204, and user device 206. It should be noted that, while shown as a smartphone, a personal computer, and a server in FIG. 2, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing system 200 performing a blockchain action may equally be applied to, and correspond to, an individual user device (e.g., user device 202, user device 204, and/or user device 206) performing the blockchain action. That is, system 200 may correspond to the user devices (e.g., user device 202, user device 204, and/or user device 206) collectively or individually.

For example, system 200 may comprise a plurality of nodes for blockchain 210. Each node may correspond to a user device (e.g., user device 202, user device 204, and/or user device 206). A node for a blockchain network may comprise an application or other software that records and/or monitors peer connections to other nodes and/or miners for the blockchain network. For example, a miner comprises a node in a blockchain network that facilitates blockchain actions by verifying blockchain actions on the blockchain, adding new blocks to the existing chain, and/or ensuring that these additions are accurate. The nodes may continually record the state of the blockchain and respond to remote procedure requests for information about the blockchain.

In some embodiments, the user devices of system 200 may comprise one or more cloud components. For example, cloud components may be implemented as a cloud computing system and may feature one or more component devices. It should also be noted that system 200 is not limited to three devices. Users may, for instance, utilize one or more devices to interact with one another, one or more servers, or other components of system 200. It should be further noted that while one or more actions (e.g., blockchain actions) are described herein as being performed by a particular component (e.g., user device 202) of system 200, those actions may, in some embodiments, be performed by other components of system 200. As an example, while one or more actions are described herein as being performed by components of user device 202, those actions may, in some embodiments, be performed by one or more cloud components. In some embodiments, the various computers and systems described herein may include one or more computing devices that are programmed to perform the described functions. Additionally, or alternatively, multiple users may interact with system 200 and/or one or more components of system 200. For example, in one embodiment, a first user and a second user may interact with system 200 using two different components (e.g., user device 204 and user device 206, respectively). Additionally, or alternatively, a single user (and/or a user account linked to a single user) may interact with system 200 and/or one or more components of system 200 using two different components (e.g., user device 202 and user device 206, respectively).

With respect to the components of system 200, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 2, both user device 202 and user device 206 include a display upon which to display data (e.g., content related to one or more blockchain actions). In some embodiments, the system may receive user inputs (e.g., via a chatbot application) requesting recommendations of potential scenarios.

Additionally, the devices in system 200 may run an application (or another suitable program). The application may cause the processors and/or control circuitry to perform operations related to conducting blockchain actions based on network mappings of self-executing program characteristics within a decentralized application environment.

Each of these devices may also include electronic storage. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes network 222, which may comprise communication paths between user devices. The communication paths may include the internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 3:
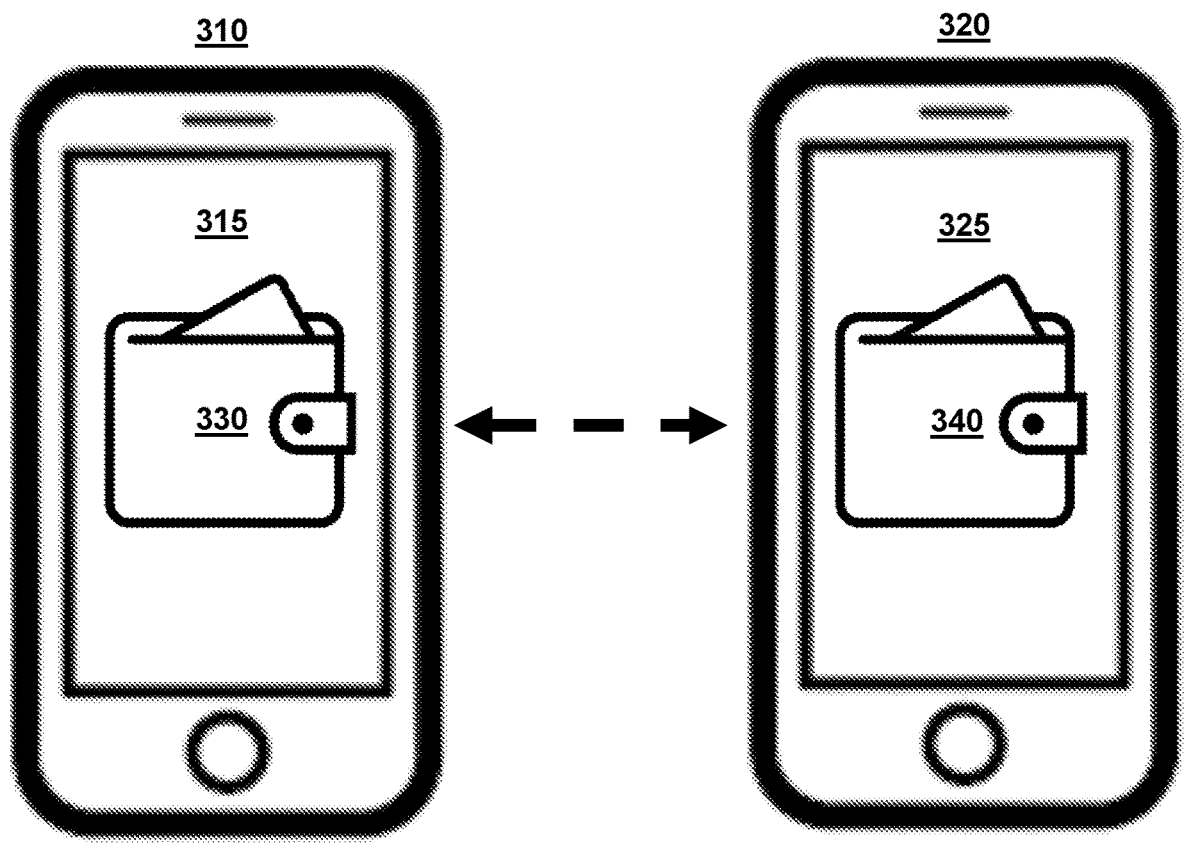
FIG. 3 shows an illustrative diagram for performing a blockchain action, in accordance with one or more embodiments.

FIG. 3 shows an illustrative diagram for conducting blockchain actions, in accordance with one or more embodiments. For example, the diagram presents various components that may be used to conduct blockchain actions based on network mappings of self-executing program characteristics in some embodiments.

FIG. 3 includes system 300, which includes user device 310 and user device 320, although other devices and/or components may also be featured in system 300 (e.g., one or more of devices and/or components shown in FIG. 2). User device 310 includes user interface 315. User device 320 includes user interface 325. As referred to herein, a "user interface" may comprise a mechanism for human-computer interaction and communication in a device and may include display screens, keyboards, a mouse, and the appearance of a desktop. For example, a user interface may comprise a way for a user to interact with and/or access an application, website, and/or other program in order to conduct blockchain actions based on network mappings of self-executing program characteristics. A user interface may display content related to network mappings. As referred to herein, "content" should be understood to mean an electronically consumable user asset, representations of goods or services (including NFT), internet content (e.g., streaming content, downloadable content, webcasts, etc.), video data, audio data, image data, and/or textual data, etc.

In some embodiments, gas may be obtained as part of a blockchain action (e.g., a purchase) using a network-specific cryptocurrency (e.g., ether in the case of Ethereum). The system may require gas (or the amount of the network-specific cryptocurrency corresponding to the required amount of gas) to be transmitted with the blockchain action as an earmark to the blockchain action. In some embodiments, gas that is earmarked for a blockchain action may be refunded back to the originator of the blockchain action if, after the computation is executed, an amount remains unused.

As shown in FIG. 3, one or more user devices may include a cryptography-based, storage application (e.g., cryptography-based, storage application 330 and cryptography-based, storage application 340) used to perform blockchain actions. The cryptography-based, storage application may be used to perform a plurality of blockchain actions across a computer network. For example, the cryptography-based, storage application may comprise a decentralized application that functions to perform one or more blockchain actions.

In some embodiments, the cryptography-based, storage application may comprise and/or be compatible with one or more application program interfaces (e.g., APIs). For example, an API may be implemented on user device 310 and/or communicate with an API implemented on user device 320. Alternatively or additionally, an API may reside on one or more cloud components. For example, an API may reside on a server and comprise a platform service for a custodial wallet service, decentralized application, etc. An API (which may be a representational state transfer (REST) or web services API layer) may provide a decoupled interface to data and/or functionality of one or more applications.

The API may provide various low-level and/or blockchain-specific operations in order to facilitate blockchain actions. For example, the API may provide blockchain actions such as blockchain writes. Furthermore, the API may perform a transfer validation ahead of forwarding the blockchain action (e.g., a transaction) to another service (e.g., a crypto service). The API may then log the outcome. For example, by logging to the blockchain prior to forwarding, the API may maintain internal records and balances without relying on external verification (e.g., which may take up to 10 minutes based on blockchain updating activity).

The API may also provide informational reads. For example, the API (or a platform service powered by the API) may generate blockchain action logs and write to an additional ledger (e.g., an internal record and/or indexer service) the outcome of the reads. If this is done, a user accessing the information through other means may see consistent information such that downstream users ingest the same data point as the user. The API may also provide a unified API to access balances, transaction histories, and/or other blockchain actions' activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

The API may provide a common, language-agnostic way of interacting with an application. In some embodiments, the API may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. Simple Object Access Protocol (SOAP) web services have traditionally been adopted in the enterprise for publishing internal services as well as for exchanging information with partners in business-to-business (B2B) transactions.

The API may use various architectural arrangements. For example, system 300 may be partially based on the API, such that there is strong adoption of SOAP and RESTful web services, using resources such as Service Repository and Developer Portal, but with low governance, standardization, and separation of concerns. Alternatively, system 300 may be fully based on the API, such that separation of concerns between layers such as an API layer, services, and applications are in place.

In some embodiments, the system architecture may use a microservice approach. Such systems may use two types of layers: front-end layers and back-end layers, where microservices reside. In this kind of architecture, the role of the API may be to provide integration between front-end and back-end layers. In such cases, the API may use RESTful APIs (exposition to front-end or even communication between microservices). The API may use the Advanced Message Queuing Protocol (AMQP), which is an open standard for passing business messages between applications or organizations. The API may use an open-source, high-performance remote procedure call (RPC) framework that may run in a decentralized application environment. In some embodiments, the system architecture may use an open API approach. In such cases, the API may use commercial or open-source API platforms and their modules. The API may use a developer portal. The API may use strong security constraints applying a web application firewall that protects the decentralized applications and/or the API against common web exploits, bots, and denial-of-service (DDoS) attacks. The API may use RESTful APIs as standard for external integration. In some embodiments, the system may use quantum-resistant cryptography algorithms and protocols to protect data at rest and data in transit.

In some embodiments, the system may also use one or more Application Binary Interfaces (ABIs) as an alternative to and/or in addition to an API. An ABI is an interface between two program modules, often between operating systems and user programs. ABIs may be specific to a blockchain protocol. For example, ABI defines the methods and structures used to interact with the binary contract similar to an API, but on a lower level. The ABI indicates to the caller of the function to encode (e.g., with ABI encoding) the needed information, such as function signatures and variable declarations, in a format that allows a virtual machine to understand what to call that function in bytecode. ABI encoding may be automated by the system using compilers or wallets interacting with the blockchain.

The cryptography-based, storage application may, in some embodiments, correspond to a digital wallet. For example, the digital wallet may comprise a repository that allows users to store, manage, and trade their cryptocurrencies and assets, interact with blockchains, and/or conduct blockchain actions using one or more applications. The digital wallet may be specific to a given blockchain protocol or may provide access to multiple blockchain protocols. In some embodiments, the system may use various types of digital wallets such as hot wallets and cold wallets. Hot wallets are connected to the internet, while cold wallets are not. Digital wallet holders may hold both a hot wallet and a cold wallet. Hot wallets are most often used to perform blockchain actions, while cold wallets are generally used for managing a user account and may have no connection to the internet.

In some embodiments, the cryptography-based, storage application may correspond to a key-based wallet or a smart contract wallet. For example, a key-based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain actions. In some embodiments, a cryptography-based, storage application may include, or have access to, a key-based wallet or a smart contract wallet. For example, the cryptography-based, storage application may comprise a digital or other type of construct (e.g., a reference, a pointer, a text on a blockchain, an address, etc.).

In some embodiments, to conduct a blockchain action, user device 310, user interface 315, and/or cryptography-based, storage application 330 may comprise, control, and/ or have access to a private key and/or digital signature. For example, system 300 may use cryptographic systems for conducting blockchain actions. For example, system 300 may use public-key cryptography, which features a pair of digital keys (e.g., which may comprise strings of data). In such cases, each pair comprises a public key (e.g., which may be public) and a private key (e.g., which may be kept private). System 300 may generate the key pairs using cryptographic algorithms (e.g., featuring one-way functions). System 300 may then encrypt a message (or other blockchain action) using an intended receiver's public key such that the encrypted message may be decrypted only with the receiver's corresponding private key. In some embodiments, system 300 may combine a message with a private key to create a digital signature on the message. For example, the digital signature may be used to verify the authenticity of blockchain actions. As an illustration, when conducting blockchain actions, system 300 may use the digital signature to prove to every node in the system that it is authorized to conduct the blockchain actions.

For example, user device 310 may request a blockchain action (e.g., conduct a transaction). The blockchain action may be authenticated by user device 310 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain action, the blockchain action may be authorized. For example, after the blockchain action is authenticated between the users, system 300 may authorize the blockchain action prior to adding it to the blockchain. System 300 may add the blockchain action to a blockchain (e.g., blockchain 210 (FIG. 2)) as part of a new block (e.g., block 216 (FIG. 2)). System 300 may perform this based on a consensus of the user devices within system 300. For example, system 300 may rely on a majority (or other metric) of the nodes in the community network to determine that the blockchain action is valid. In response to validation of the block, a node user device (e.g., user device 320) in the community network (e.g., a miner) may receive a reward (e.g., in a given cryptocurrency) as an incentive for validating the block.

To validate the blockchain action, system 300 may use one or more validation protocols and/or validation mechanisms. For example, system 300 may use a proof-of-work mechanism in which a user device must provide evidence that it performed computational work to validate a blockchain action, and thus this mechanism provides a manner for achieving consensus in a decentralized manner as well as preventing fraudulent validations. For example, the proof-of-work mechanism may involve iterations of a hashing algorithm. The user device that is successful aggregates and records blockchain actions from a mempool (e.g., a collection of all valid blockchain actions waiting to be confirmed by the blockchain network) into the next block. Alternatively or additionally, system 300 may use a proof-of-stake mechanism in which a user account (e.g., corresponding to a node on the blockchain network) is required to have, or "stake," a predetermined amount of tokens in order for system 300 to recognize it as a validator in the blockchain network.

In response to validation of the block, the block is added to a blockchain (e.g., blockchain 210 (FIG. 2)), and the blockchain action is completed. For example, to add the blockchain action to a blockchain, the successful node (e.g., the successful miner) encapsulates the blockchain action in a new block before transmitting the block throughout system 300.

In some embodiments, a cryptography-based, storage application may comprise a decentralized application. As referred to herein, a "decentralized application" may comprise an application that exists on a blockchain and/or a peer-to-peer network. For example, a decentralized application may comprise an application that has a back end that is in part powered by a decentralized peer-to-peer network such as a decentralized, open-source blockchain with smart contract functionality.

For example, the cryptography-based, storage application (e.g., cryptography-based, storage application 330) may allow a user device (e.g., user device 310) to share files, access, and/or perform a blockchain action with another user device (e.g., user device 320) and/or cryptography-based, storage application (e.g., cryptography-based, storage application 340). For example, the peer-to-peer architecture and decentralized nature allows blockchain actions to be conducted between the user devices, without the need of any intermediaries or central authorities.

Figure 4:
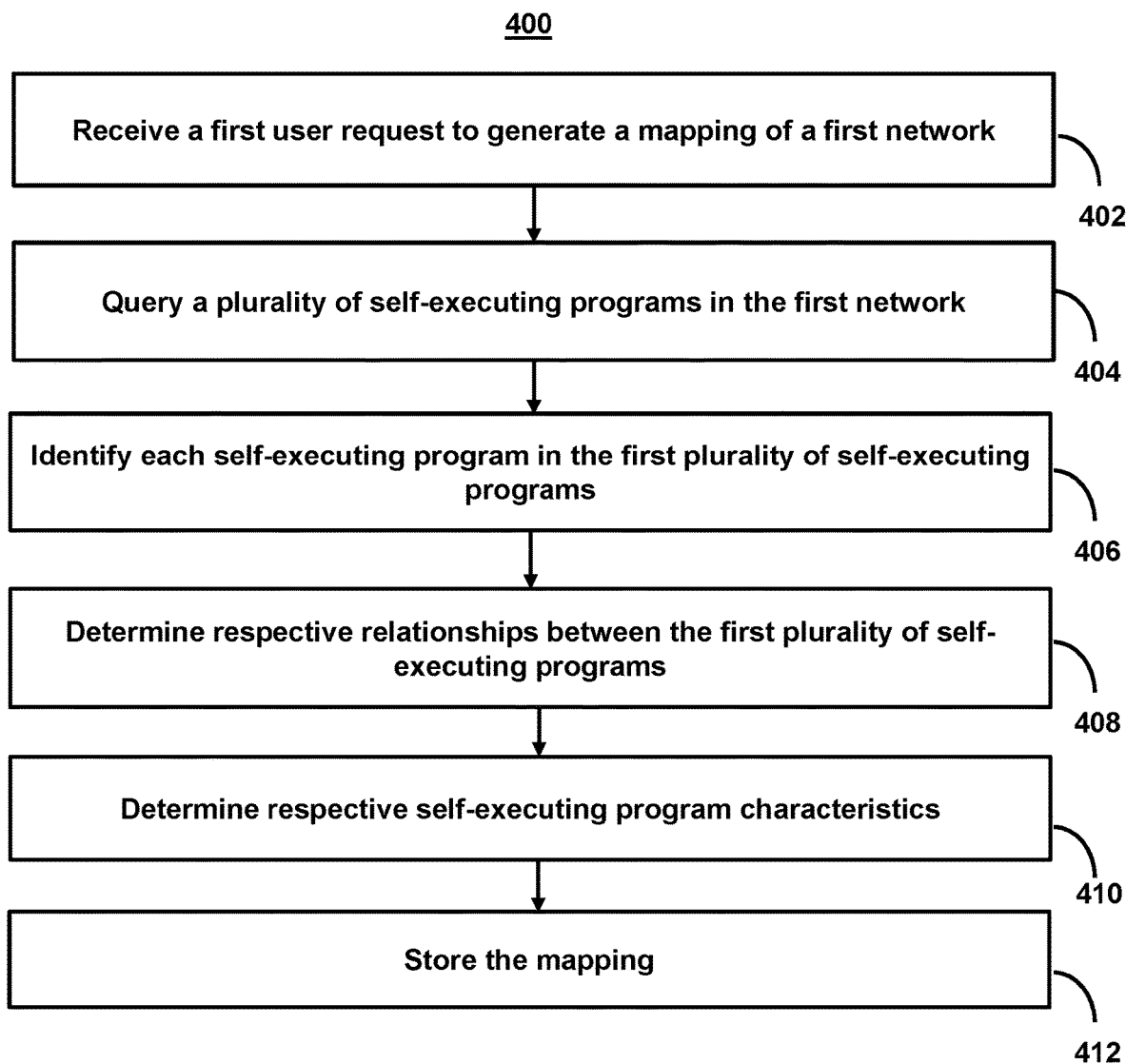
FIG. 4 shows a flowchart of the steps involved in generating network mappings of self-executing program characteristics, in accordance with one or more embodiments.

FIG. 4 shows a flowchart of the steps involved in generating network mappings of self-executing program characteristics, in accordance with one or more embodiments. For example, the system may use process 400 (e.g., as implemented on one or more system components described above) in order to generate a mapping. For example, to map the applications on a computer network, a system may first need to identify all self-executing programs (e.g., smart contracts), associated self-executing programs, and other applications (e.g., oracles, network bridges, linked databases, decentralized systems) running on or on top of the network, along with their specific requirements and characteristics. This could involve conducting a network assessment or inventory to identify all the devices and systems connected to the network, as well as the applications and services running on those devices.

Once a complete inventory is obtained, the system may then evaluate each one in terms of particular requirements (e.g., compliance, security, etc.). As such, the system may determine specific configuration and attributes of each application, device, and program, and identify any potential conflicts with predetermined criteria (e.g., compliance, security, etc.) or compatibility issues.

At step 402, process 400 (e.g., using one or more components described above) receives a first user request to generate a mapping of a first network. For example, the system may receive a first user request to generate a mapping of a first network, wherein the mapping indicates self-executing program characteristics corresponding to each self-executing program of a first plurality of self-executing programs. For example, the system may generate a map or index of all self-executing programs (e.g., smart contracts) and associated self-executing programs, and/or other applications (e.g., oracles, network bridges, linked databases, DeFi systems) running on or on top of a blockchain network. Furthermore, the system may identify specific self-executing program characteristics.

At step 404, process 400 (e.g., using one or more components described above) queries a plurality of self-executing programs in the first network. For example, the system may, in response to the first user request, query the first plurality of self-executing programs to generate the mapping. For example, to generate the mapping, the system may iterate through and/or index all self-executing programs (e.g., smart contracts), associated self-executing programs, and/or other applications (e.g., oracles, network bridges, linked databases, DeFi systems) running on or on top of a blockchain network. When doing so, the system may not only identify and/or label each self-executing program in the first plurality of self-executing programs, but the system may also identify and/or label the relationships between each self-executing program in the first plurality of self-executing programs. By doing so, the system may use these relationships in order to perform blockchain actions that require coordination (e.g., serial processing, parallel processing, etc.) between self-executing programs as well as determine potential options (e.g., which one or more self-executing programs to use) to perform a blockchain action. The system may also identify the characteristics of each self-executing program in the first plurality of self-executing programs. By doing so, the system may filter between and/or select a self-executing program in the first plurality of self-executing programs that meets predetermined requirements.

At step 406, process 400 (e.g., using one or more components described above) identifies each self-executing program in the first plurality of self-executing programs. For example, the system may identify each self-executing program in the first plurality of self-executing programs. By doing so, the system may determine what self-executing programs are available in the network.

At step 408, process 400 (e.g., using one or more components described above) determines respective relationships between the first plurality of self-executing programs. For example, the system may determine respective relationships between each self-executing program in the first plurality of self-executing programs and other self-executing programs in the first plurality of self-executing programs. By doing so, the system may determine which self-executing programs rely on other programs, which may be used to conduct one or more blockchain actions (e.g., actions that require a combination of self-executing programs).

At step 410, process 400 (e.g., using one or more components described above) determines respective self-executing program characteristics. For example, the system may determine respective self-executing program characteristics for each self-executing program in the first plurality of self-executing programs. By doing so, the system may compare these characteristics to requirements for a blockchain action.

At step 412, process 400 (e.g., using one or more components described above) stores the mapping. For example, the system may store the mapping for conducting blockchain actions and/or facilitate other actions. For example, the system may receive a second user request to perform a first blockchain action using the first network, wherein the second user request comprises a first self-executing program requirement. The system may determine, based on the mapping, a second plurality of self-executing programs corresponding to the first self-executing program requirement and the first blockchain action. The system may generate a first recommendation for performing the first blockchain action using the second plurality of self-executing programs.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
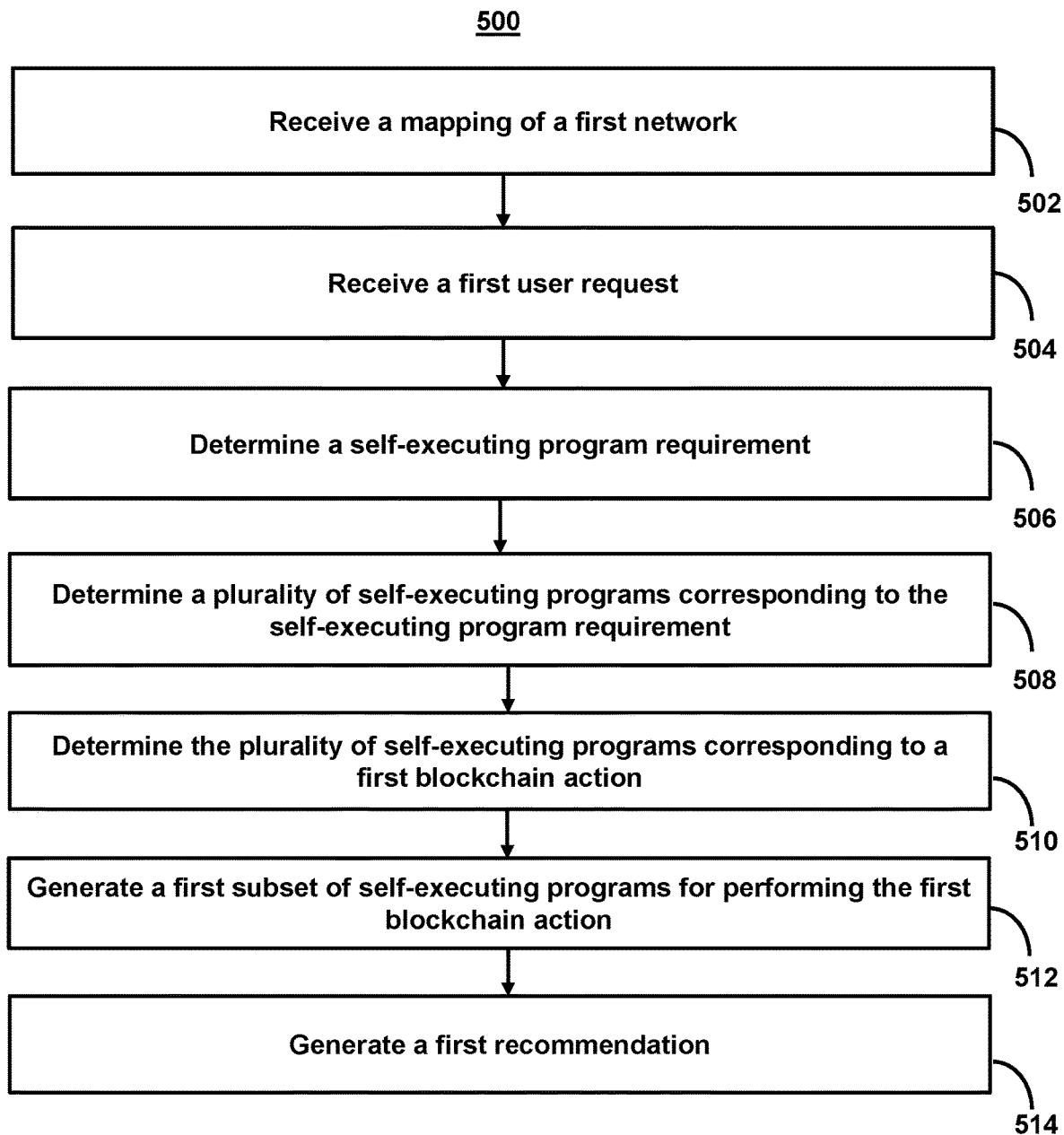
FIG. 5 shows a flowchart of the steps involved in conducting blockchain actions based on the network mappings, in accordance with one or more embodiments.

FIG. 5 shows a flowchart of the steps involved in conducting blockchain actions based on the network mappings, in accordance with one or more embodiments. For example, having mapped the network design and configuration, the system may constrain the ability of network users to only use self-executing programs and other applications that are compliant with the predetermined criteria. By doing so, the system optimizes usage of the network given particular user needs, such as protection of sensitive data (e.g., using zero knowledge proofs, homomorphic encryption, etc.). Additionally or alternatively, the system may ensure that the mapping and requirements enforcement is reliable and efficient and may identify any potential issues or problems. That is, the system may provide recommendation for both conduction actions on a network, but also recommendations on the most efficient and/or beneficial manner in which to conduct those actions.

At step 502, process 500 (e.g., using one or more components described above) receives a mapping of a first network. For example, the system may receive a mapping of a first network, wherein the mapping indicates self-executing program characteristics corresponding to each self-executing program of a first plurality of self-executing programs. For example, the system may generate a map or index of all self-executing programs (e.g., smart contracts) and associated self-executing programs, and/or other applications (e.g., oracles, network bridges, linked databases, DeFi systems) running on or on top of a blockchain network. Furthermore, the system may identify specific self-executing program characteristics.

At step 504, process 500 (e.g., using one or more components described above) receives a first user request. For example, the system may receive a first user request to perform a first blockchain action using the first network. For example, the system may receive a user request to perform one or more actions involving one or more self-executing programs, associated self-executing programs, and/or other applications (e.g., oracles, network bridges, linked databases, DeFi systems) running on or on top of a blockchain network.

At step 506, process 500 (e.g., using one or more components described above) determines a self-executing program requirement. For example, the system may determine a first self-executing program requirement for the first user request. For example, the system may also receive (e.g., along with a request to perform a blockchain action) a requirement that certain criteria be met when performing the action. These criteria may be expressed to the system in the form of one or more self-executing program requirements (e.g., based on upholding compliance, security, etc.).

At step 508, process 500 (e.g., using one or more components described above) determines a plurality of self-executing programs corresponding to the self-executing program requirement. For example, the system may determine, based on the mapping, a second plurality of self-executing programs corresponding to the first self-executing program requirement. The system may access the mapping of the blockchain network and determine a plurality of self-executing programs (e.g., a subset of all of the self-executing programs, associated self-executing programs, and/or other applications on the network) that correspond to the requirement. For example, the system may filter the available self-executing programs on the network for those that correspond to the requirement.

For example, to identify a plurality of self-executing programs that are suitable for performing the blockchain action, the system may determine whether one or more self-executing program characteristics for a self-executing program correspond to (or conflict with) the self-executing program requirement. For example, the system may receive the mapping of the first network. The system may then compare the first self-executing program requirement to the self-executing program characteristics corresponding to each self-executing program of the first plurality of self-executing programs.

In some embodiments, the system may further filter the self-executing programs to ensure that only known entities (or self-executing programs corresponding to known entities) are used. For example, the system may retrieve a list of known entities. The system may filter the first subset based on the list of known entities to generate a second subset of self-executing programs for performing the first blockchain action. The system may generate a second recommendation, on the first user device, for performing the first blockchain action using the second subset.

In some embodiments, the system may independently validate known entities and/or label known entities. The system may then further filter the self-executing programs to ensure that only known entities (or self-executing programs corresponding to known entities) are used. For example, the system may retrieve known entity labels validated by a blockchain platform service. The system may filter the first subset based on the known entity labels to generate a second subset of self-executing programs for performing the first blockchain action. The system may generate a second recommendation, on the first user device, for performing the first blockchain action using the second subset.

In some embodiments, the system may use characteristics of different types of assets and/or whether or not asset types are supported to select self-executing programs for performing the first blockchain action. For example, the system may require a blockchain action to be performed using a particular type of cryptocurrency. In such cases, determining the second plurality of self-executing programs corresponding to the first self-executing program requirement may further comprise the system determining an asset characteristic for the first blockchain action and filtering the first plurality of self-executing programs based on whether each of the first plurality of self-executing programs supports the asset characteristic.

At step 510, process 500 (e.g., using one or more components described above) determines the plurality of self-executing programs corresponding to a first blockchain action. For example, the system may determine a third plurality of self-executing programs corresponding to the first blockchain action. The system may determine the plurality of self-executing programs that corresponds to the blockchain action. For example, this may include a particular self-executing program that performs the blockchain action as well as a combination of self-executing programs (whether done simultaneously, serially, etc.) needed to perform the blockchain action.

In some embodiments, a blockchain action may require coordination (e.g., serial processing, parallel processing, etc.) between self-executing programs. For example, a single blockchain action may require multiple self-executing programs to be executed in series. For example, the system may determine a series of self-executing programs required to be serially executed to perform the first blockchain action. The system may assign each self-executing program in the series of self-executing programs to the third plurality of self-executing programs.

In some embodiments, a blockchain action may require coordination (e.g., serial processing, parallel processing, etc.) between self-executing programs. For example, a single blockchain action may require multiple self-executing programs to be executed in parallel and/or other combinations. For example, the system may determine a plurality of combinations of self-executing programs from the second plurality of self-executing programs required to be executed to perform the first blockchain action. The system may then assign each self-executing program of the self-executing programs in the plurality of combinations to the third plurality of self-executing programs.

In some embodiments, the system may use one or more artificial intelligence models to assist with performing a blockchain action. For example, the model may process the numerous self-executing programs, associated self-executing programs, and/or other applications (e.g., oracles, network bridges, linked databases, DeFi systems) running on or on top of a blockchain network to determine the optimal combination and/or recommendations for performing blockchain actions optimal to the user. The model may receive inputs describing each self-executing program in the first plurality of self-executing programs, the relationships between each self-executing program in the first plurality of self-executing programs, and the characteristics of each self-executing program in the first plurality of self-executing programs. For example, in some embodiments, determining the plurality of combinations of the self-executing programs of the second plurality of self-executing programs required to be executed to perform the first blockchain action may comprise the system generating a feature input based on the plurality of combinations of the self-executing programs of the second plurality of self-executing programs. The system may then input the feature input into an artificial intelligence model to generate an output. The system may determine the first subset of the first plurality of self-executing programs based on the output.

At step 512, process 500 (e.g., using one or more components described above) generates a first subset of self-executing programs for performing the first blockchain action. For example, the system may filter the third plurality of self-executing programs based on the second plurality of self-executing programs to generate a first subset of self-executing programs for performing the first blockchain action. The system may then determine the self-executing program or programs that may both perform the blockchain action as well as meet the requirements set by the user request.

For example, when filtering self-executing programs, the system may filter individual blockchain networks based on the user request. For example, the system may filter each network based on a throughput speed corresponding to each network (e.g., a speed at which new blocks on a network are confirmed/minted), based on a protocol of the network, etc. For example, the system may determine a plurality of available networks for performing the first blockchain action. The system may filter the plurality of available networks based on the first user request.

In some embodiments, the system may use one or more artificial intelligence models to determine the first subset. For example, the model may receive inputs describing each self-executing program, the relationships between each self-executing program, and the characteristics of each self-executing program. For example, the system may generate a feature input based on the second plurality of self-executing programs. The system may input the feature input into an artificial intelligence model to generate an output. The system may determine the first subset of the first plurality of self-executing programs based on the output. For example, the system may convert the descriptions about each self-executing program, the relationships between each self-executing program, and the characteristics of each self-executing program into a format that may be ingested by the model. To do so, the system may determine a plurality of self-executing program characteristics for the second plurality of self-executing programs. The system may then generate an array of values representing the plurality of self-executing program characteristics.

At step 514, process 500 (e.g., using one or more components described above) generates a first recommendation. For example, the system may generate a first recommendation, on a first user device, for performing the first blockchain action using the first subset. For example, the recommendation may identify a particular self-executing program or a subset of programs for use in performing the blockchain action. In some embodiments, the system may rank various self-executing programs, network connections, combinations of programs, etc., for performing the blockchain action. In some embodiments, the system may provide a user with an option to execute the blockchain action. For example, the system may receive a third user request in response to the first recommendation. The system may execute the first blockchain action based on the first recommendation. Additionally or alternatively, the system may monitor for the blockchain action. For example, the system may monitor a blockchain network following the execution of a blockchain action. Upon determining that the action has been confirmed by the network, the system may generate a confirmation to the user. As such, the system may determine that the first blockchain action has been executed. The system may generate for display, on a user interface, a confirmation that the first blockchain action has been executed based on the first recommendation.

In some embodiments, the system may further allow users to filter the self-executing programs based on additional selected requirements. In some embodiments, these requirements may request optimal connections and/or processing strategies (e.g., to minimize processing power, network fees, and/or time requirements). For example, the system may receive a second user request to apply a second self-executing program requirement. The system may filter the first subset based on the second self-executing program requirement to generate a second subset of self-executing programs for performing the first blockchain action. The system may generate a second recommendation, on the first user device, for performing the first blockchain action using the second subset.

In some embodiments, the system may determine multiple different self-executing programs and/or combinations thereof for performing the blockchain action. The system may then rank (e.g., based on characteristics of the self-executing programs, other predetermined criteria, and/or user preferences) those self-executing programs and/or combinations thereof. The system may then generate a recommendation based on those rankings. For example, the system may rank the first plurality of self-executing programs based on the first self-executing program requirement to generate a plurality of rankings. The system may filter the plurality of rankings based on a threshold ranking to determine the first subset.

Additionally or alternatively, if the system determines that there are no compliant self-executing programs, the system may generate for display a message informing the user and/or otherwise prevent the blockchain action.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
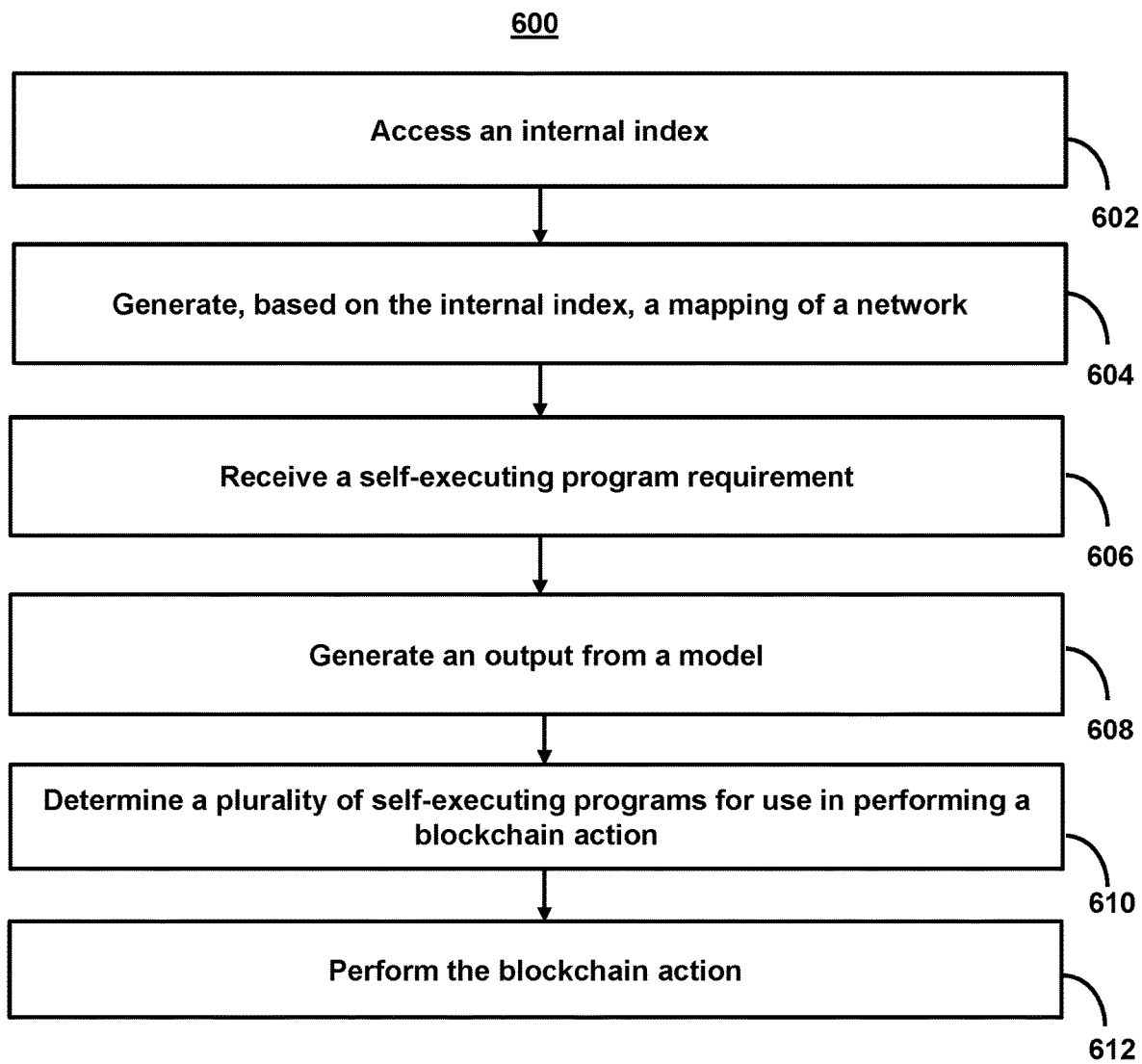
FIG. 6 shows a flowchart of the steps involved in facilitating use of artificial intelligence platforms to generate network mappings for conducting blockchain actions, in accordance with one or more embodiments.

FIG. 6 shows a flowchart of the steps involved in facilitating use of artificial intelligence platforms to generate network mappings for conducting blockchain actions. For example, the system may use process 600 (e.g., using one or more components described above) in order to perform one or more blockchain actions using a plurality of selected self-executing programs. For example, the system may receive a user request to perform a first blockchain action across a first network to access a first digital asset. For example, the first network may include a decentralized computer network (e.g., a blockchain network). The user request may be a request to access a digital asset such as a cryptocurrency, an NFT, utility token, security token, initial coin offerings, or other blockchain-related assets.

At step 602, process 600 (e.g., using one or more components described above) accesses an internal index. For example, the system may access an internal index for an artificial intelligence platform, wherein the internal index comprises on-chain self-executing program characteristics and off-chain self-executing program characteristics, and wherein the on-chain self-executing program characteristics and off-chain self-executing program characteristics are archived in the internal index based on respective temporal identifiers.

In some embodiments, the system generates the internal index by receiving a first on-chain self-executing program characteristic. The system may then determine whether the first on-chain self-executing program characteristic is received from an on-chain source or an off-chain source. The system may then assign a first temporal identifier based on determining whether the first on-chain self-executing program characteristic is received from the on-chain source or the off-chain source.

In some embodiments, the system may use different formats for different types of temporal identifiers. The system may select a given format based on whether data is on-chain or off-chain data. For example, temporal identifiers can be represented in various formats depending on the level of granularity and the specific requirements of the application. For example, the system may treat data differently based on whether the data is on-chain or off-chain data. The system may therefore store data using different formats that are specific to a given type of data.

The format may include UNIX timestamps. A UNIX timestamp is a numeric value representing the number of seconds or milliseconds that have elapsed since Jan. 1, 1970, at 00:00:00 UTC. It provides a simple and widely used format for representing temporal information. The format may include date and time strings. For example, temporal identifiers can be represented as date and time strings using various formats, such as ISO 8601 format (e.g., "YYYY-MM-DDTHH:MM:SS"), RFC 3339 format, or custom formats based on the application's requirements (e.g., how the system uses, trains models, etc., on data). The format may include date components. For example, temporal identifiers can be split into separate components such as year, month, day, hour, minute, and second. For example, a date can be represented as "YYYY-MM-DD" and time as "HH:MM:SS". The format may include Julian dates. For example, a Julian date is a continuous count of days and fractions since noon (12:00 PM) Universal Time on January 1, 4713 BCE, in the Julian calendar. It is often used in scientific and astronomical applications. The format may include epoch-based formats. For example, similar to UNIX timestamps, epoch-based formats represent temporal identifiers as the number of units (seconds, milliseconds, or nanoseconds) that have elapsed since a specific epoch. The epoch can be a different reference point than the UNIX epoch. The format may include a universally unique identifier (UUID), which can be combined with a timestamp to create a temporal identifier. This approach provides uniqueness and includes temporal information in a single value. The format may include interval notations. For example, temporal intervals can be represented using notations such as start time and end time, duration, or a combination of both, (e.g., "start_time" and "end_time" or "start_time" with a "duration" value). In some embodiments, the system may include a characteristic related to training a model. For example, the internal notation may comprise a frequency to update data, a weight to attribute to data, etc.

For example, the system may determine to assign a first temporal identifier to the first on-chain self-executing program characteristic. The system may determine a first type of temporal identifier for the first temporal identifier, wherein the first type of temporal identifier comprises a first format that is specific to on-chain data. The system may determine to assign a second temporal identifier to a first off-chain self-executing program characteristic. The system may determine a second type of temporal identifier for the second temporal identifier, wherein the second type of temporal identifier comprises a second format that is specific to off-chain data.

In some embodiments, the archiving of the on-chain self-executing program characteristics and off-chain self-executing program characteristics in the internal index based on respective temporal identifiers may comprise tagging, sorting, and/or partitioning data. For example, the internal index may comprise a flagging or status field. The system may add a flag or status field to the data in the internal index to indicate the status of each record, such as "on-chain" or "off-chain." When data meets the archival criteria (e.g., is determined to be on-chain or off-chain data), the system may update the status field accordingly. This approach keeps both active and archived data in the same index but allows the system to distinguish between the two. For example, the system may determine a respective tag for each of the on-chain self-executing program characteristics and the off-chain self-executing program characteristics based on whether each of the on-chain self-executing program characteristics and the off-chain self-executing program characteristics is an on-chain self-executing program characteristic or an off-chain self-executing program characteristic.

In some embodiments, the internal index may comprise a partition of received data in the internal index. The system may support partitioning, which allows the system to divide a large data source into smaller, more manageable partitions based on a specific criterion (e.g., on-chain or off-chain data). For example, the system may partition each of the on-chain self-executing program characteristics and the off-chain self-executing program characteristics based on the respective tag.

In some embodiments, the system may further partition the data based on other criteria such as date or time. For example, the system may create partitions based on time intervals, such as monthly or yearly partitions. As new data comes in, the system may move older partitions to a separate archival storage location. For example, the system may determine a respective tag for each of the on-chain self-executing program characteristics and the off-chain self-executing program characteristics based on whether each of the on-chain self-executing program characteristics and the off-chain self-executing program characteristics is an on-chain self-executing program characteristic or an off-chain self-executing program characteristic. The system may determine a respective frequency for each of the on-chain self-executing program characteristics and the off-chain self-executing program characteristics based on the respective tag. The system may update each of the on-chain self-executing program characteristics and the off-chain self-executing program characteristics at the respective frequency.

In some embodiments, the internal index may comprise weights for received data. For example, the system may add a weight to the data in the internal index based on the status of each record, such as "on-chain" or "off-chain." When data meets the archival criteria (e.g., is determined to be on-chain or off-chain data), the system may update the status field accordingly. By doing so, the system allows the artificial intelligence model to account for the differences in the receipt (e.g., latency in updating the internal index based on latency in blockchains). For example, the system may determine a respective weight for each of the on-chain self-executing program characteristics and the off-chain self-executing program characteristics based on whether each of the on-chain self-executing program characteristics and the off-chain self-executing program characteristics is an on-chain self-executing program characteristic or an off-chain self-executing program characteristic. The system may train the artificial intelligence model based on the respective weight for each of the on-chain self-executing program characteristics and the off-chain self-executing program characteristics.

At step 604, process 600 (e.g., using one or more components described above) generates, based on the internal index, a mapping of a network. For example, the system may generate, based on the internal index, a mapping of a first network, wherein the mapping indicates self-executing program characteristics corresponding to each self-executing program of a first plurality of self-executing programs. In some embodiments, the mapping may include known entities and/or known connections. For example, the system may retrieve a list of known entities. The system may determine the second plurality of self-executing programs based on the list of known entities.

At step 606, process 600 (e.g., using one or more components described above) receives a self-executing program requirement. For example, the system may receive a first self-executing program requirement for a first blockchain action. The first self-executing program requirement may be a throughput speed, use of a specific network, maximum gas fee, maximum slippage, a user request to batch the first blockchain action (or batch the first blockchain action in a batch of a given size), or other self-executing program requirement. In some embodiments, the system may determine a set of self-executing program requirements. For example, the first user request may include one or more user-specified (or other default) self-executing program requirements, such as the use of a specific network, and a maximum slippage value. By doing so, the system may use the first self-executing program requirement (or set of self-executing program requirements) to filter network connections, thereby reducing cost of the blockchain action, decreasing system latency, downtime, and maintaining blockchain action security respective of the first self-executing program requirement.

At step 608, process 600 (e.g., using one or more components described above) generates an output from a model. For example, the system may generate, based on the first self-executing program requirement and the first blockchain action, an output from an artificial intelligence model, wherein the artificial intelligence platform is trained to generate predictions for performing blockchain actions on the first network by adjusting weights of the artificial intelligence platform according to the respective temporal identifiers.

In some embodiments, determining, based on the mapping, a first series of network connections may be based on an artificial intelligence model. For example, determining, based on the mapping, a first series of network connections to the first plurality of locations may be based on an artificial intelligence model. As discussed above, due the vast array of locations where digital assets reside, the numerous connections in which to access the digital asset, and the different transactions that must take place to access such assets, using one or more artificial intelligence models may be advantageous to determine different network connections to the locations. As such, the system may first determine a plurality of networks for use in performing blockchain actions across the first network. For example, the system may determine the networks that are available to be used to access the digital asset.

In some embodiments, the system may generate a feature input for the artificial intelligence model. For example, the system may generate the feature input based on the plurality of networks. The system may first determine a plurality of network characteristics for the plurality of networks. Network characteristics may refer to the type of network a network is (e.g., an exchange, liquidity pool, bridge service, wrap service, price service, swap service, etc.), consensus protocols, token standards, asset type (e.g., cryptocurrency, NFT, token, etc.), security, transparency (e.g., transparency of fees), or other network-related characteristics. The system may then generate the feature input for the artificial intelligence model, such as an array of values representing the plurality of network characteristics. For example, the array of values may be an array of numbers, alphanumeric characters, or other values configured to be inputted into an artificial intelligence model. In some embodiments, the artificial intelligence model may be a neural network, a Recurrent Neural Network (RNN), Support Vector Machine (SVM), Convolutional Neural Network (CNN), a deep learning model, decision tree, logistic regression model, or other artificial intelligence model. In some embodiments, the feature input may be based on the network characteristics and the first plurality of locations (e.g., to which a digital asset resides). For example, the system may generate the feature input as an array of values representing (i) the network characteristics and (ii) the first plurality of locations. In this way, the feature input may be provided to the artificial intelligence model to determine a set of network connections associated with accessing the first digital asset.

In some embodiments, the system may input the feature input into the artificial intelligence model to generate an output. For example, the output may be a set of network connections associated with accessing the first digital asset. For instance, the output may include multiple network connections (e.g., including one or more networks) that the system may interact with to access the first digital asset. As such, the system may determine the first series of network connections to the first plurality of locations based on the output. By using an artificial intelligence model to determine a set of network connections (e.g., to the first plurality of locations), the system may reduce the cost of performing blockchain actions and improve the user experience as such determination may quickly identify available network connections to access a given digital asset.

At step 610, process 600 (e.g., using one or more components described above) determines a plurality of self-executing programs for use in performing a blockchain action. For example, the system may, based on the output, determine a second plurality of self-executing programs for use in performing the first blockchain action.

For example, the system may determine a first plurality of locations of the first digital asset across the first network. As a given digital asset may be available on a multitude of different networks, wallets, addresses, services, or exchanges, the system may determine each location that the digital asset is available through. By doing so, the system may determine a small set of locations where the first digital asset is available as opposed to considering all possible computer networks, thereby reducing the amount of computer processing resources required to generate network processing connections instructions.

In some embodiments, the system may compare asset characteristics to characteristics of available digital assets to determine the first plurality of locations of the first digital asset. For example, the system may determine an asset characteristic for the first digital asset. For example, the system may use characteristics of different types of assets to locate the first digital asset.

In some embodiments, the first plurality of locations may be filtered based on entity labels. For example, the system may retrieve known entity labels validated by the mapping and may filter the first plurality of locations based on the known entity labels (e.g., for the first plurality of locations) to generate the first plurality of locations. For instance, some networks in which digital assets are available may be trustworthy and secure, whereas others are untrustworthy and unsecure. To maintain system security for performing blockchain actions, the mapping (e.g., a service that controls one or more blockchain actions, a service that is related to validating blockchain actions, etc.) may store information related to whether a blockchain entity (e.g., network, wallet, or other location hosting a digital asset) is a trusted entity, a security entity, or a valid/legitimate entity. The system may independently validate known entities and/or label known entities as such, and these labels may be used when determining locations to which a digital asset to be accessed is located. By doing so, the system may maintain a higher level of security by filtering out locations that may be accessed (e.g., for the digital asset) to only locations that are known/validated locations.

In some embodiments, determining, based on the mapping, a first series of network connections may include executing self-executing programs in a given order. For example, the system may determine the first series of network connections to the first plurality of locations by first determining a plurality of networks for use in performing blockchain actions across the first network. The system may then generate an order of the plurality of networks to the first plurality of locations and may filter the plurality of orders based on the first self-executing program requirement (e.g., as indicated via the user request). For example, when filtering available connections, the system may filter orders in which networks are used based on the self-executing program requirement. For example, the system may filter a first order of networks based on a max fee corresponding to using the first order to process a blockchain action.

In some embodiments, determining, based on the mapping, a first series of network connections may be based on a determined series of operations. For example, to generate instructions of network processing connections when conducting blockchain actions, multiple operations may need to take place to obtain a given digital asset. As such, the system may determine network connections based on a determined series of operations that may be required to access a given digital asset.

In some embodiments, determining the first series of network connections to the first plurality of locations may be based on a priority. For example, the system may first determine (i) a first plurality of networks and (ii) a second plurality of networks for use in performing blockchain actions across the first network. The system may then prioritize use of the first plurality of networks to determine the first series of network connections to the first plurality of locations. For example, the system may favor particular networks, accounts, entities, or other blockchain-related networks/locations when determining a network connection. In this way, the system may prioritize the use of certain networks, thereby maintaining blockchain action security.

In some embodiments, the system may filter the first series of network connections based on the first self-executing program requirement to determine the second plurality of self-executing programs. As discussed above, the self-executing program requirement may be related to the processing of the blockchain action. For instance, to access a digital asset with the lowest overall cost, the system may filter the first series of network connections to determine the network connection with the lowest overall cost. As another example, to access a digital asset with the fastest possible transaction speed (e.g., to avoid exchange slippage), the system may filter the first series of network connections to determine the shortest path (e.g., connection) possible to access the digital asset. Although each of the first series of network connections may be a sufficient vehicle for accessing the digital asset, some of the network connections may not be suitable based on the user request. For example, the user request may specify a particular self-executing program requirement for performing the blockchain action. As such, the system may filter the first series of network connections to determine the second plurality of self-executing programs that are associated with the self-executing program requirement. By doing so, the system may generate a subset of network connections that may be suitable for the given user request—thereby reducing the amount of computer processing and computer memory resources required to generate an instruction for performing the first blockchain action.

In some embodiments, filtering the first series of network connections may be based on a threshold ranking. For example, the system may filter the first series of network connections based on the first self-executing program requirement to determine the second plurality of self-executing programs by ranking the first series of network connections based on the first self-executing program requirement. For instance, by ranking the first series of network connections based on the first self-executing program requirement, the system may generate a plurality of rankings. The system may then filter the plurality of rankings based on a threshold ranking to determine the series of network connections. The threshold ranking may represent a predetermined value.

In some embodiments, filtering the first series of network connections may be based on the use of a given network. For example, the system may filter the first series of network connections based on the first self-executing program requirement to determine the second plurality of self-executing programs by first determining a network corresponding to the first self-executing program requirement. The system may then filter the first series of network connections based on whether each of the network connections in the first series of network connections includes the network. As each network connection (e.g., of the first series of network connections) may include different networks to "pass through" or transact with to obtain the first digital asset, some of these network connections may include networks that are unsafe to transact with (e.g., do not meet KYC requirements, fail to meet certain token protocols, etc.). Therefore, the first user request may specify the use of a particular network that is known to be safe to obtain the first digital asset. The system may determine the network (e.g., network name, network identifier, or other network-related information) that corresponds to the self-executing program requirement (e.g., denoting the particular network) and may filter each of the network connections to network connections that include the given network. By doing so, the system may ensure secure obtainment of the first digital asset by filtering network connections that include the indicated network.

In some embodiments, filtering the first series of network connections may be based on a maximum gas fee. For example, the system may filter the first series of network connections based on the first self-executing program requirement to determine the second plurality of self-executing programs by first determining a maximum gas fee requirement corresponding to the first self-executing program requirement. By doing so, the system may select the network connections that are associated with the lowest gas fees—thereby improving the user experience while reducing the amount of computer processing and computer memory resources required to provide an instruction to the user (e.g., by reducing the amount of network connections available to be recommended to the user).

In some embodiments, filtering the first series of network connections may be based on a throughput speed. For example, the system may filter the first series of network connections based on the first self-executing program requirement to generate the first series of network connections by first determining a throughput requirement corresponding to the first self-executing program requirement. For instance, a user may want to obtain the digital asset as fast as possible, which, in volatile networks, may reduce the amount of slippage a given asset may experience. To accomplish this, the system may determine that the throughput requirement may be 6 tx/second (e.g., 6 transactions per second). The system may then determine the throughput speed for each of the network connections in the first series of network connections. For example, the system may add the throughput speed for each network in a given network connection or may average the throughput speed for each network in a given network connection to determine the throughput speed for each of the network connections in the first series of network connections. Upon determining the throughput speed for each network connection in the first series of network connections, the system may filter the first series of network connections based on the throughput requirement to determine the second plurality of self-executing programs. By doing so, the system may reduce the effects of asset slippage by filtering the network connections based on the throughput requirement—thereby improving the user experience while reducing the cost of accessing digital assets.

At step 612, process 600 (e.g., using one or more components described above) performs the blockchain action. For example, the system may perform the first blockchain action using the second plurality of self-executing programs.

In some embodiments, the system may generate a first instruction for performing the first blockchain action based on the series of network connections. The first instruction may be a suggestion indicating a set of network connections to take for accessing the first digital asset. As the instruction is based on the series of network connections (e.g., filtered network connections corresponding to the first self-executing program requirement, an ordered set of network connections, etc.), the instruction may include one or more of the series of network connections. By doing so (e.g., providing an instruction), the system may provide a set of most efficient network connections for accessing a digital asset while improving the user experience and maintaining blockchain action security (e.g., as the network connections are filtered based on a self-executing program requirement).

In some embodiments, the system may generate a second instruction for performing the first blockchain action. For example, the system may receive a second user request to apply a second self-executing program requirement. For instance, the user may want to access the first digital asset via a network connection that not only includes a specific network but is also below a maximum gas fee. Thus, the system may filter the series of network connections based on the second self-executing program requirement (e.g., the maximum gas fee), to generate a third plurality of self-executing programs. Based on the third plurality of self-executing programs, the system may generate a second instruction (e.g., on the first user device), for performing the first blockchain action. By doing so, the system may further allow users to filter the network connections based on user-selected characteristics—thereby improving the user experience.

In some embodiments, the system may generate the first instruction based on known entities. For example, the system may retrieve a list of known entities and filter the series of network connections based on the list of known entities. By filtering the second plurality of self-executing programs based on the list of known entities (e.g., trusted entities, secure entities, favored entities, etc.), the system may generate a third plurality of self-executing programs, where the first instruction is further based on the third plurality of self-executing programs. By doing so, the system may further filter the network connections to ensure that only known entities (or connections with known entities) are used, thereby improving the user experience and increasing blockchain action security.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
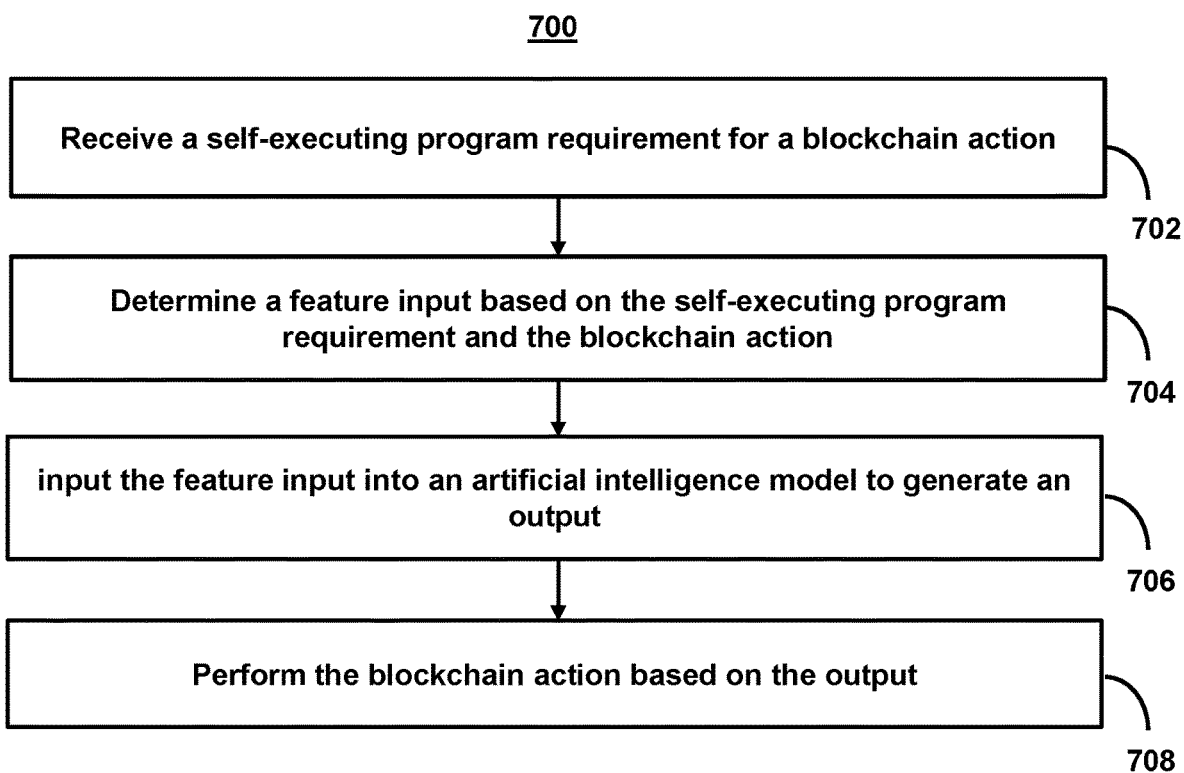
FIG. 7 shows a flowchart of the steps involved in facilitating use of artificial intelligence platforms trained on blockchain action lineages to conduct blockchain actions, in accordance with one or more embodiments.

FIG. 7 shows a flowchart of the steps involved in facilitating use of artificial intelligence platforms trained on blockchain action lineages to conduct blockchain actions, in accordance with one or more embodiments.

At step 702, process 700 (e.g., using one or more components described above) receives a self-executing program requirement for a blockchain action. For example, the system may receive a first self-executing program requirement for a requested blockchain action across a first network. The system may receive the self-executing program requirement from a user (via a user interface) or as an automated process that initiates a request for a specific blockchain action on the blockchain network. For example, in response to receiving the request, the system may interact with a self-executing program, executing a transaction and/or invoking a function within a self-executing program that queries a user for the self-executing program requirement. The request may be sent over a communication protocol (such as TCP/IP or HTTP) to nodes or miners within the blockchain network by the system. The request may contain details about the desired blockchain action, such as the contract address, function parameters, gas limit, and other necessary information. The system may additionally or alternatively determine a self-executing program requirement based on the requested blockchain action. For example, the system may access a set of predetermined requirements for various blockchain actions. The system may then transmit the request to nodes on the blockchain network. Each node may validate the request to ensure it adheres to protocol rules, formatting requirements, and/or meets security criteria indicated by the self-executing program requirement. If valid, the node propagates the request to other nodes in the network. If the requested blockchain action involves a self-executing program, the node receiving the request identifies the target contract based on the provided address and interprets the blockchain action based on the contract's programming logic.

At step 704, process 700 (e.g., using one or more components described above) determines a feature input based on the self-executing program requirement and the blockchain action. For example, the system may determine a first feature input based on the first self-executing program requirement and the requested blockchain action. In some embodiments, the feature input may refer to the individual components or variables used as inputs to the model for making predictions or performing tasks. These features represent specific aspects or characteristics of the data that the model learns from to generate an output or prediction. The feature input may comprise numerical values (e.g., continuous or discrete numerical data such as prices, quantities, temperatures, timestamps, etc.), categorical variables (e.g., discrete variables that represent categories or classes, often encoded as binary values using techniques like one-hot encoding), textual data (e.g., features extracted from text, which may involve techniques like tokenization, word embeddings, or text vectorization to convert text inputs into numerical representations understandable by the model), temporal data (e.g., time-related features such as timestamps, time intervals, time series data, or seasonality patterns), spatial data (e.g., features related to geographical or spatial information, such as coordinates, regions, or locations), images or pixels (e.g., pixel values or image representations that serve as features), derived or engineered features (e.g., combinations or transformations of existing features that might provide more meaningful information to the model), and/or Boolean values (e.g., binary inputs indicating true/false, yes/no, or presence/absence of certain attributes).

In some embodiments, determining the first feature input based on the first self-executing program requirement and the requested blockchain action may comprise the system accessing an internal index, wherein the internal index comprises archived on-chain self-executing program characteristics and archived off-chain self-executing program characteristics and wherein the archived on-chain self-executing program characteristics and the archived off-chain self-executing program characteristics are archived in the internal index based on respective temporal identifiers. The system may generate, based on the internal index, a mapping of a first network, wherein the mapping indicates the archived on-chain self-executing program characteristics and the archived off-chain self-executing program characteristics corresponding to each self-executing program of a first plurality of self-executing programs. The system may include the first feature input in the mapping.

At step 706, process 700 (e.g., using one or more components described above) inputs the feature input into an artificial intelligence model to generate an output. For example, the system may input the first feature input into an artificial intelligence model to generate a first output, wherein the artificial intelligence model is trained to generate predictions for performing blockchain actions on the first network by adjusting weights of the artificial intelligence model according to a first subset of blockchain action lineages used to conduct a first subset of blockchain actions, wherein the first subset of blockchain action lineages indicates self-executing program characteristics corresponding to each self-executing program of a first plurality of self-executing programs used to conduct one or more of the first subset of blockchain actions.

In some embodiments, the system may determine the first subset of blockchain action lineages used to conduct the first subset of blockchain actions, which further comprises determining a first blockchain action lineage by determining a first self-executing program used to conduct a first blockchain action, wherein the first subset of blockchain actions comprises the first blockchain action and determining a second self-executing program used to conduct the first blockchain action, wherein the first subset of blockchain actions comprises the first blockchain action. The system may then determine a first self-executing program characteristic corresponding to the first self-executing program and determine a second self-executing program characteristic corresponding to the second self-executing program.

In some embodiments, the artificial intelligence model may be trained to generate predictions for performing blockchain actions by identifying a first cryptography-based storage application corresponding to one or more of the first subset of blockchain action lineages and correlating the first cryptography-based storage application to a known entity. For example, the system may correlate network data like connection logs with application transaction logs to reconstruct detailed forensic audit trails for compliance and oversight purposes. The system may implement fine-grained security policies to restrict financial transaction traffic to only authorized applications, users, and devices. This helps guard against fraud or theft. To do so, the system may gather historical data related to blockchain actions, including transaction details, smart contract interactions, block confirmations, and associated metadata. This data forms the training dataset for the model. The system may extract relevant features from the collected data, such as transaction parameters, timestamps, block confirmations, transaction volumes, and smart contract interactions. The system may encode these features into a format suitable for the AI model, such as numerical or categorical representations. The system may define the prediction task and labels for the model. For instance, if predicting successful or failed transactions, the system may label the data accordingly based on transaction outcomes. Within the blockchain action lineages, the system may identify specific cryptography-based storage applications or smart contracts associated with storage functionalities. These applications often manage data storage, tokenization, or encryption on the blockchain. The system may correlate the identified cryptography-based storage applications to known entities or known functions within the blockchain network. This correlation might involve associating these applications with specific organizations, protocols, token standards (like ERC-20 and ERC-721), or known decentralized applications (DApps). The system may then utilize machine learning algorithms, such as neural networks or decision trees, to train the model on the prepared dataset. The model learns patterns and relationships between the extracted features and the defined prediction task. The system may analyze the importance of features within the model to understand which characteristics are more influential in predicting blockchain actions. The system may evaluate the model's performance using validation or test datasets to ensure its accuracy and effectiveness in predicting outcomes. Once trained, the model can generate predictions for performing blockchain actions based on new input data. It leverages the learned patterns to predict outcomes or suggest optimal actions based on the identified features and correlations to known entities, including cryptography-based storage applications. The system may continuously refine and improve the model by iteratively updating the training data, adjusting model parameters, incorporating additional features, or retraining the model with more recent data to adapt to changing blockchain dynamics.

In some embodiments, the artificial intelligence model is trained to generate predictions for performing blockchain actions by determining a pattern corresponding to one or more of the first subset of blockchain action lineages and determining an anomaly in the pattern. For example, the system may model baseline traffic patterns for trading applications to detect anomalous surges that could reflect denial of service attacks or rogue trading activity. The system may thus understand usage patterns and performance across the network. To do so, the system may gather historical blockchain transaction data, including details such as transaction timestamps, sender/receiver addresses, transaction types, block confirmations, and any other relevant metadata. The system may preprocess the data by cleaning, organizing, and formatting it for training. The system may extract features from the blockchain action lineages that might be relevant for identifying patterns and anomalies. These features could include transaction frequencies, sequence patterns, temporal characteristics, transaction sizes, or any other significant attributes related to blockchain actions. The system may utilize machine learning techniques to train a model, such as recurrent neural networks (RNNs), long short-term memory networks (LSTMs), or other sequence-based models. The system may train the model to identify patterns within the first subset of blockchain action lineages. The model learns the typical sequence of actions and transactions. After training, the model is applied to new or unseen blockchain action lineages. The model uses its learned patterns to predict or generate expected sequences of actions. Anomalies or deviations from these expected patterns are flagged as outliers or anomalies by the model. These could be unusual transaction sequences, unexpected transaction sizes, irregular timestamps, or any divergence from the learned patterns. Additionally, the system may establish thresholds or criteria for determining what constitutes an anomaly based on the model's predictions. The system may differentiate between normal variations and significant anomalies by setting appropriate thresholds or using anomaly scoring methods. The system may deploy the trained model for real-time monitoring of incoming blockchain action lineages. The system may continuously analyze new data to detect deviations or anomalies from the learned patterns. When the model identifies anomalies, the system may generate alerts or reports to notify system administrators or relevant stakeholders about potential irregularities or unexpected behavior within the blockchain actions.

At step 708, process 700 (e.g., using one or more components described above) performs the blockchain action based on the output. For example, the system may perform the requested blockchain action based on the first output. In some embodiments, the system may generate for display, on a user interface, a confirmation of the requested blockchain action being performed.

In some embodiments, the system may perform the blockchain action by determining a first blockchain lineage (or a self-executing program or characteristic within that lineage) for performing the requested blockchain action and using the first blockchain lineage (or the self-executing program or characteristic within that lineage) to perform the requested blockchain action. For example, the system may determine that to perform a blockchain action (e.g., complete a transaction), a series of intermediate blockchain actions may be required (e.g., as the transaction propagates through the network, it creates a lineage—a chronological sequence of self-executing programs and transactions—showing the history and path of the transaction's propagation). The system may send a request detailing the desired blockchain actions, self-executing programs, and/or characteristics thereof to the blockchain network. This request may contain information such as sender address, recipient address (if applicable), action parameters, digital signature for authentication, gas limit (for computation cost), etc. The lineage may ensure that the transaction is executed in the correct sequence of self-executing programs and/or that each intermediate blockchain action, self-executing program, and/or characteristics thereof meets the blockchain action requirement.

For example, in some embodiments, the system may determine a second plurality of self-executing programs for use in performing the requested blockchain action and use the second plurality of self-executing programs to perform the requested blockchain action. That is, the system may determine that in order to perform a given blockchain action, multiple intermediary blockchain actions may be required and/or multiple intermediary self-executing programs may be required to be executed. In such cases, the system may identify each of these intermediary self-executing programs as well as a sequence for executing them.

In some embodiments, the system may further determine a first self-executing program characteristic for performing the requested blockchain action and use the first self-executing program characteristic to perform the requested blockchain action. For example, the system may determine that a particular self-executing program is required to be executed (and/or that the particular self-executing program needs to have a particular characteristic during execution). In some embodiments, the system may determine this characteristic based on a blockchain action requirement (e.g., the self-executing program needs a particular security credential, KYC confirmation, etc.) or based on the blockchain action (e.g., to perform the blockchain action, the system may need to execute a specific self-executing program that is identified by the characteristic).

In some embodiments, the blockchain action may comprise pinpointing how certain users, applications, and/or endpoints are impacted during network congestion or outages based on the traffic data in a blockchain network. As one example, the system may determine a first plurality of locations (e.g., corresponding to certain users, applications, and/or endpoints) across the first network for performing the requested blockchain action and determine a first series of network connections to the first plurality of locations. The system may then analyze the network connections, locations, and/or characteristics thereof. For example, pinpointing how certain users, applications, or endpoints are impacted during network congestion or outages within a blockchain network may involve analyzing traffic data and observing patterns to assess the effects on specific entities. To do so, the system may continuously monitor and collect traffic data (e.g., blockchain lineages and/or related characteristics) within the blockchain network. This data (e.g., training data) may include information such as transaction rates, network latency, packet loss, throughput, and communication patterns between nodes, users, applications, or endpoints. Using collected traffic data, the system may identify anomalies or irregularities that indicate network congestion or outages. This could include sudden drops in transaction confirmation times, increased latency, a rise in unconfirmed transactions, or disruptions in communication between nodes. Analyzing the traffic data, the system may correlate the observed network anomalies with the activities of specific users, applications, and/or endpoints (e.g., the system may examine the traffic originating from or directed towards these entities during periods of congestion or outages). By associating network performance issues with particular users, applications, and/or endpoints, the system may determine the impact experienced by these entities. For example, the system may identify delays in transactions sent by certain users, disruptions in communication for specific applications, or increased latency affecting particular endpoints. Utilizing performance metrics derived from traffic data analysis, the system quantifies the impact on users, applications, and/or endpoints. Such metrics could include transaction confirmation times, throughput reduction, increased error rates, or degraded user experience. Additionally, the system may conduct further analysis to determine the root cause of the congestion or outages. It explores factors such as increased transaction volume, network limitations, node failures, or resource constraints that contribute to the observed issues. Based on the identified impacts and root causes, the system may generate reports or alerts highlighting the affected entities and the severity of the impact. This information may help in devising strategies for mitigating congestion or resolving network outages. Leveraging the insights gained from traffic data analysis, the system may generate recommendations that suggest adaptive strategies or optimizations to improve network resilience, enhance resource allocation, or optimize traffic routing to prevent future disruptions.

In some embodiments, performing the blockchain action may comprise the system ensuring that the blockchain action corresponds to a specific digital asset and/or temporal identifier. For example, the digital assets on a blockchain are often represented by unique identifiers or tokens. Each token or asset is distinguished by its unique identifier or address within the blockchain. These identifiers may serve as references to specific assets. Self-executing programs on a blockchain can manage digital assets by encoding rules that govern their ownership and transfer. These self-executing programs may contain logic to verify ownership and enforce rules for asset transfers based on specific conditions, such as valid signatures or authorization, and/or at specific temporal identifiers. In some embodiments, temporal identifiers, such as timestamps or block numbers within a blockchain, help establish the chronological order of actions. They ensure that actions involving assets are performed in a sequential and time-ordered manner, providing a temporal reference for the actions. Additionally or alternatively, the system may use metadata specifying the asset's identifier or reference.

In some embodiments, the system may perform the requested blockchain action based on the first output by predicting an availability of a first computer resource and, based on the availability, using the first computer resource to perform the requested blockchain action. For example, the system may use the output to analyze transaction latencies and volumes by region or network segment to identify any bottlenecks in the infrastructure impacting trading applications. For example, the system may collect data related to blockchain actions and/or self-executing program characteristics from the blockchain network, including transaction timestamps, sender and receiver addresses, block confirmation times, and any additional metadata related to one or more blockchain actions. The characteristics are categorized or segmented based on their originating regions or specific network segments. This segmentation might involve geolocation data or network identifiers to distinguish transactions coming from different areas or network components. The system calculates characteristics (e.g., transaction latencies) by analyzing the time differences between when blockchain actions were initiated and when they were confirmed or included in blocks. It also computes transaction volumes—counting the number of blockchain actions per region or network segment within a specified time frame. Utilizing blockchain action lineages, the system traces the path of blockchain actions, identifying the sequence of blocks and their respective confirmations. This analysis helps in understanding the flow and propagation of transactions across the blockchain network. By correlating transaction latencies and volumes with specific regions or network segments, the system identifies areas where higher latencies or increased transaction volumes exist. Bottlenecks can be inferred from regions/network segments experiencing delays or congestion due to high transaction volumes or network issues. The system may compare the transaction latencies and volumes across different regions or segments, looking for disparities or anomalies. Significant deviations from expected latency or volume patterns may indicate potential bottlenecks or inefficiencies in specific areas. Further investigation may be conducted to determine the root causes of identified bottlenecks. This could involve analyzing network infrastructure, node performance, network congestion, or other factors impacting transaction processing in the affected regions or segments. Based on the analysis, the system may generate recommendations and/or reports highlighting regions or segments experiencing bottlenecks, the severity of the issues, and their impact on trading applications. It may also provide recommendations for optimizing infrastructure, redistributing loads, or implementing improvements to alleviate bottlenecks.

Additionally or alternatively, the system may use the output to perform real-time monitoring of trading applications and transaction flows to rapidly detect any performance issues or outages that could impact time-sensitive financial transactions. For example, the system continuously collects real-time data (e.g., blockchain action characteristics and self-executing program characteristics) from the blockchain network, including transaction details, block confirmations, timestamps, transaction volumes, and any associated metadata. The system may track application response times, user interactions, API calls, and other relevant metrics to gauge the application's health and responsiveness. By analyzing transaction flows in real time, the system tracks the movement of transactions across the blockchain network. It examines the sequence of transactions, their propagation, and the confirmation status to ensure transactions are progressing as expected. Utilizing blockchain action lineages, the system traces the paths of blockchain actions in real time. It follows the lineage to understand the order of transactions, their dependencies, and any potential delays or congestion points within the network. The system calculates and monitors real-time performance metrics such as blockchain action confirmation times, throughput, block propagation times, and network latency. It compares these metrics against predefined thresholds or historical data to identify anomalies. Automated alerting systems may be used to trigger notifications when performance metrics deviate significantly from expected thresholds. These alerts prompt immediate attention to potential issues or outages impacting transaction flows. Upon detecting performance issues or outages, the system initiates diagnostics to identify root causes. It may investigate factors like network congestion, node failures, latency spikes, or abnormalities in transaction confirmations that might impact financial transactions. The system engages in immediate corrective actions or mitigation strategies to address identified performance issues or outages. This may involve load balancing, adjusting network configurations, rerouting transactions, or implementing temporary fixes to restore normalcy.

Additionally or alternatively, the system may use the output to increase resiliency and security by using network telemetry data to feed automation systems that can take actions to scale resources up or down based on demand, contain threats, and/or route traffic around failures. For example, the system may continuously collect network telemetry data, including information on network performance, traffic patterns, node health, latency, throughput, and security-related metrics such as anomaly detection and threat analysis. The system may integrate the telemetry data with automation systems to enable these systems to receive real-time updates and insights into the network's status, allowing for automated responses and actions based on predefined rules and algorithms. Automation systems may leverage telemetry data to monitor network demand and performance metrics. Based on this data, the systems autonomously scale resources up or down, allocating additional computing power, storage, or network bandwidth in response to increased demand or traffic spikes. Conversely, they can also scale down resources during low-demand periods to optimize efficiency. Network telemetry data, including security-related metrics and anomaly detection, allows automation systems to identify potential threats or malicious activities within the blockchain network. Automated responses can be triggered to contain and mitigate these threats by isolating affected nodes, blocking suspicious traffic, or applying access controls and security policies. Using blockchain action lineages and telemetry data, automation systems identify network failures or degraded components. They autonomously reroute traffic around these failures, redirecting transactions or communication pathways to alternative, healthy nodes or network segments to ensure uninterrupted operation and maintain transaction integrity. Automation systems can apply policy-based routing strategies based on telemetry data. For instance, if a particular segment experiences high latency or congestion, the system may dynamically reroute traffic through alternate paths or nodes to optimize performance and resilience. Redundancy mechanisms can also be automated to activate backup nodes or resources in case of primary system failures. Utilizing historical telemetry data, automation systems employ predictive analytics to foresee potential issues or vulnerabilities before they occur. By proactively identifying trends and patterns, the system can take preemptive actions to prevent or mitigate future network disruptions or security threats. Automation systems continuously learn from telemetry data and feedback loops. They adapt their actions and responses based on evolving network conditions, refining their algorithms and response strategies to improve resiliency and security over time.

In some embodiments, performing the requested blockchain action based on the first output may comprise the system determining a type of the requested blockchain action and determining whether to prioritize the requested blockchain action based on the type. For example, the system may prioritize financial transactional traffic over other applications by implementing Quality of Service (QoS) policies based on deep packet inspection (e.g., ensuring critical transactions are not impacted). The system may implement QoS policies to prioritize financial transactional traffic over other applications based on deep packet inspection (DPI) using blockchain lineages. DPI involves inspecting the content of data packets passing through the network to identify the type of traffic, such as financial transactions versus non-critical data. It examines packet headers and payload content to classify and prioritize traffic. Utilizing blockchain action lineages, the system identifies packets associated with financial transactions. Transactions are traced through the blockchain, and the system correlates these transactions with specific network packets flowing through the network. QoS policies are established to define the priority levels for different types of traffic. Critical financial transactional traffic is assigned a higher priority level compared to non-critical or lower-priority data. Deep packet inspection techniques may be applied to inspect incoming packets. The system analyzes packet headers or payload content to distinguish financial transactional packets from other types of traffic based on predefined criteria. Upon identification, packets associated with financial transactions are marked, tagged, or classified with appropriate QoS labels indicating their high-priority status. This marking enables routers or switches to prioritize these packets according to the QoS policies. Network devices such as routers and switches use the QoS labels assigned to packets to prioritize the handling of traffic. Packets marked as high priority due to being associated with financial transactions are placed in priority queues and processed with higher precedence over other traffic. QoS policies ensure that sufficient bandwidth and network resources are allocated to critical financial transactional traffic to prevent congestion and minimize latency. This allocation ensures that these transactions experience minimal delays or disruptions. The system continuously monitors network conditions, transaction volumes, and performance to dynamically adjust QoS policies as needed. It adapts to changing traffic patterns and network demands to maintain optimal prioritization for financial transactions.

In some embodiments, the system may perform the requested blockchain action based on the first output by determining a predicted blockchain action characteristic for the requested blockchain action and comparing the predicted blockchain action characteristic to the first self-executing program requirement to determine whether to perform the requested blockchain action. For example, the system may improve security by implementing dynamic access controls, restricting or allowing traffic based on application, endpoint, and protocol by predicting characteristics. The system may increase resiliency and security by using network telemetry data to feed automation systems that can take actions to scale resources up or down based on demand, contain threats, or route traffic around failures based on predicted characteristics. The system may pinpoint exactly how certain users, applications, or endpoints are impacted during network congestion or outages based on the traffic data based on predicted characteristics. To do so, the system may initiate a request for a specific action on the blockchain network. This request could involve transaction execution, smart contract interaction, or invoking a function within a smart contract. The system may employ a model trained to predict blockchain action characteristics based on historical data and current context. The model generates a prediction for the expected outcome or characteristic of the requested action based on its analysis of similar past actions or patterns. The self-executing program associated with the requested action contains predefined conditions, rules, or logic that govern the execution of the action. It outlines the requirements that need to be met for the action to be performed. The system compares the predicted blockchain action characteristic generated by the model to the requirements specified by the self-executing program. It evaluates whether the predicted outcome aligns with the conditions set in the program requirements. Based on the comparison, the system validates whether the predicted blockchain action characteristic meets the criteria specified by the self-executing program. If the predicted characteristic aligns with the requirements, indicating that the action complies with the predefined conditions, the system proceeds to perform the requested blockchain action. Upon validation, the system executes the requested action on the blockchain network. This execution could involve initiating a transaction, interacting with a self-executing program, updating the ledger, transferring assets, or triggering specific functions within the requirement. Once the action is executed successfully and confirmed by the network, the system receives confirmation of the action completion and records the transaction details, updating the blockchain ledger.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for conducting blockchain actions based on network mappings of self-executing program characteristics.
2. The method of the preceding embodiment, the method comprising: receiving a mapping of a first network, wherein the mapping indicates self-executing program characteristics corresponding to each self-executing program of a first plurality of self-executing programs; receiving a first user request to perform a first blockchain action using the first network; determining a first self-executing program requirement for the first user request; determining, based on the mapping, a second plurality of self-executing programs corresponding to the first self-executing program requirement; determining a third plurality of self-executing programs corresponding to the first blockchain action; filtering the third plurality of self-executing programs based on the second plurality of self-executing programs to generate a first subset of self-executing programs for performing the first blockchain action; and generating a first recommendation, on a first user device, for performing the first blockchain action using the first subset.
3. The method of any one of the preceding embodiments, wherein determining the second plurality of self-executing programs corresponding to the first self-executing program requirement further comprises: receiving the mapping of the first network; and comparing the first self-executing program requirement to the self-executing program characteristics corresponding to each self-executing program of the first plurality of self-executing programs.
4. The method of any one of the preceding embodiments, wherein the mapping is generated by: identifying each self-executing program in the first plurality of self-executing programs; determining respective relationships between each self-executing program in the first plurality of self-executing programs and other self-executing programs in the first plurality of self-executing programs; and recording the respective relationships.
5. The method of any one of the preceding embodiments, wherein determining the third plurality of self-executing programs corresponding to the first blockchain action further comprises: determining a series of self-executing programs required to be serially executed to perform the first blockchain action; and assigning each self-executing program in the series of self-executing programs to the third plurality of self-executing programs.
6. The method of any one of the preceding embodiments, wherein determining the third plurality of self-executing programs corresponding to the first blockchain action further comprises: determining a plurality of combinations of self-executing programs from the second plurality of self-executing programs required to be executed to perform the first blockchain action; and assigning each self-executing program of the self-executing programs in the plurality of combinations to the third plurality of self-executing programs.
7. The method of any one of the preceding embodiments, wherein determining the plurality of combinations of the self-executing programs of the second plurality of self-executing programs required to be executed to perform the first blockchain action further comprises: generating a feature input based on the plurality of combinations of the self-executing programs of the second plurality of self-executing programs; inputting the feature input into an artificial intelligence model to generate an output; and determining the first subset of the first plurality of self-executing programs based on the output.
8. The method of any one of the preceding embodiments, further comprising: receiving a second user request to apply a second self-executing program requirement; filtering the first subset based on the second self-executing program requirement to generate a second subset of self-executing programs for performing the first blockchain action; and generating a second recommendation, on the first user device, for performing the first blockchain action using the second subset.
9. The method of any one of the preceding embodiments, further comprising: retrieving a list of known entities; filtering the first subset based on the list of known entities to generate a second subset of self-executing programs for performing the first blockchain action; and generating a second recommendation, on the first user device, for performing the first blockchain action using the second subset.
10. The method of any one of the preceding embodiments, further comprising: retrieving known entity labels validated by a blockchain platform service; filtering the first subset based on the known entity labels to generate a second subset of self-executing programs for performing the first blockchain action; and generating a second recommendation, on the first user device, for performing the first blockchain action using the second subset.
11. The method of any one of the preceding embodiments, wherein determining the second plurality of self-executing programs corresponding to the first self-executing program requirement further comprises: determining an asset characteristic for the first blockchain action; and filtering the first plurality of self-executing programs based on whether each of the first plurality of self-executing programs supports the asset characteristic.
12. The method of any one of the preceding embodiments, wherein filtering the second plurality of self-executing programs based on the first self-executing program requirement to generate the first subset further comprises: determining a plurality of available networks for performing the first blockchain action; and filtering the plurality of available networks based on the first user request.
13. The method of any one of the preceding embodiments, wherein determining that the second plurality of self-executing programs corresponding to the first self-executing program requirement further comprises: querying each of the first plurality of self-executing programs for a self-executing program characteristic; and determining whether each of the first plurality of self-executing programs corresponds to the self-executing program characteristic.
14. The method of any one of the preceding embodiments, wherein filtering the third plurality of self-executing programs based on the second plurality of self-executing programs to generate a first subset of self-executing programs for performing the first blockchain action further comprises: generating a feature input based on the second plurality of self-executing programs; inputting the feature input into an artificial intelligence model to generate an output; and determining the first subset of the first plurality of self-executing programs based on the output.

15. The method of any one of the preceding embodiments, wherein generating the feature input based on the second plurality of self-executing programs further comprises: determining a plurality of self-executing program characteristics for the second plurality of self-executing programs; and generating an array of values representing the plurality of self-executing program characteristics.

16. The method of any one of the preceding embodiments, wherein filtering the third plurality of self-executing programs based on the second plurality of self-executing programs to generate the first subset further comprises: ranking the first plurality of self-executing programs based on the first self-executing program requirement to generate a plurality of rankings; and filtering the plurality of rankings based on a threshold ranking to determine the first subset.

17. The method of any one of the preceding embodiments, the method comprising: receiving a first user request to generate a mapping of a first network, wherein the mapping indicates self-executing program characteristics corresponding to each self-executing program of a first plurality of self-executing programs; in response to the first user request, querying the first plurality of self-executing programs to generate the mapping by: identifying each self-executing program in the first plurality of self-executing programs; determining respective relationships between each self-executing program in the first plurality of self-executing programs and other self-executing programs in the first plurality of self-executing programs; and determining respective self-executing program characteristics for each self-executing program in the first plurality of self-executing programs; and storing the mapping.

18. The method of any one of the preceding embodiments, the method comprising: receiving a second user request to perform a first blockchain action using the first network, wherein the second user request comprises a first self-executing program requirement; determining, based on the mapping, a second plurality of self-executing programs corresponding to the first self-executing program requirement and the first blockchain action; and generating a first recommendation for performing the first blockchain action using the second plurality of self-executing programs.

19. The method of any one of the preceding embodiments, the method comprising: receiving a third user request in response to the first recommendation; and executing the first blockchain action based on the first recommendation.

20. The method of any one of the preceding embodiments, the method comprising: determining that the first blockchain action has been executed; and generating for display, on a user interface, a confirmation that the first blockchain action has been executed based on the first recommendation.

21. A method for facilitating use of artificial intelligence platforms to generate network mappings for conducting blockchain actions, the method comprising: accessing an internal index for an artificial intelligence platform, wherein the internal index comprises on-chain self-executing program characteristics and off-chain self-executing program characteristics, and wherein the on-chain self-executing program characteristics and off-chain self-executing program characteristics are archived in the internal index based on respective temporal identifiers; generating, based on the internal index, a mapping of a first network, wherein the mapping indicates self-executing program characteristics corresponding to each self-executing program of a first plurality of self-executing programs; receiving a first self-executing program requirement for a first blockchain action; inputting a feature input for an artificial intelligence platform to generate an output, wherein the artificial intelligence platform is trained to generate predictions for performing blockchain actions on the first network by adjusting weights of the artificial intelligence platform according to the respective temporal identifiers; based on the output, determining a second plurality of self-executing programs for use in performing the first blockchain action; and performing the first blockchain action using the second plurality of self-executing programs.

22. The method of any one of the preceding embodiments, further comprising: generating the internal index by receiving a first on-chain self-executing program characteristic; determining whether the first on-chain self-executing program characteristic is received from an on-chain source or an off-chain source; and assigning a first temporal identifier based on determining whether the first on-chain self-executing program characteristic is received from the on-chain source or the off-chain source.

23. The method of any one of the preceding embodiments, further comprising: determining to assign a first temporal identifier to the first on-chain self-executing program characteristic; determining a first type of temporal identifier for the first temporal identifier, wherein the first type of temporal identifier comprises a first format that is specific to on-chain data; determining to assign a second temporal identifier to a first off-chain self-executing program characteristic; and determining a second type of temporal identifier for the second temporal identifier, wherein the second type of temporal identifier comprises a second format that is specific to off-chain data.

24. The method of any one of the preceding embodiments, wherein archiving the on-chain self-executing program characteristics and off-chain self-executing program characteristics in the internal index based on respective temporal identifiers further comprises: determining a respective tag for each of the on-chain self-executing program characteristics and the off-chain self-executing program characteristics based on whether each of the on-chain self-executing program characteristics and the off-chain self-executing program characteristics is an on-chain self-executing program characteristic or an off-chain self-executing program characteristic; and partitioning each of the on-chain self-executing program characteristics and the off-chain self-executing program characteristics based on the respective tag.

25. The method of any one of the preceding embodiments, wherein archiving the on-chain self-executing program characteristics and off-chain self-executing program characteristics in the internal index based on respective temporal identifiers further comprises: determining a respective tag for each of the on-chain self-executing program characteristics and the off-chain self-executing program characteristics based on whether each of the on-chain self-executing program characteristics and the off-chain self-executing program characteristics is an on-chain self-executing program characteristic or an off-chain self-executing program characteristic; determining a respective frequency for each of the on-chain self-executing program characteristics and the off-chain self-executing program characteristics based on the respective tag; and updating each of the on-chain self-executing program characteristics and the off-chain self-executing program characteristics at the respective frequency.

26. The method of any one of the preceding embodiments, wherein archiving the on-chain self-executing program characteristics and off-chain self-executing program characteristics in the internal index based on respective temporal identifiers further comprises: determining a respective weight for each of the on-chain self-executing program characteristics and the off-chain self-executing program characteristics based on whether each of the on-chain self-executing program characteristics and the off-chain self-executing program characteristics is an on-chain self-executing program characteristic or an off-chain self-executing program characteristic; and training the artificial intelligence model based on the respective weight for each of the on-chain self-executing program characteristics and the off-chain self-executing program characteristics.

27. The method of any one of the preceding embodiments, further comprising: retrieving a list of known entities; and determining the second plurality of self-executing programs based on the list of known entities.

28. The method of any one of the preceding embodiments, further comprising: receiving a first user request to perform a first blockchain action across the first network to access a first digital asset; determining a first plurality of locations of the first digital asset across the first network; determining, based on the mapping, a first series of network connections to the first plurality of locations; and filtering the first series of network connections based on the first self-executing program requirement to determine the second plurality of self-executing programs.

29. The method of any one of the preceding embodiments, further comprising: receiving a second user request to apply a second self-executing program requirement; filtering the second plurality of self-executing programs based on the second self-executing program requirement to generate a third plurality of self-executing programs; and generating a second instruction for performing the first blockchain action based on the third plurality of self-executing programs.

30. The method of any one of the preceding embodiments, further comprising: retrieving known entity labels validated by the mapping; and filtering the first plurality of locations based on the known entity labels.

31. The method of any one of the preceding embodiments, wherein filtering the first series of network connections based on the first self-executing program requirement to determine the second plurality of self-executing programs further comprises: determining a first network and a second network in the first series of network connections; and filtering the first network and the second network based on the first self-executing program requirement.

32. The method of any one of the preceding embodiments, wherein filtering the first series of network connections based on the first self-executing program requirement to determine the second plurality of self-executing programs further comprises: ranking the first series of network connections based on the first self-executing program requirement to generate a plurality of rankings; and filtering the plurality of rankings based on a threshold ranking to determine the first series of network connections.

33. The method of any one of the preceding embodiments, wherein determining the first plurality of locations of the first digital asset across the first network further comprises: determining an asset characteristic for the first digital asset; and comparing the asset characteristic to characteristics of available digital assets.

34. A method for facilitating use of artificial intelligence platforms to generating network mappings for conducting blockchain actions, the method comprising: receiving a first user request to perform a first blockchain action across a first network to access a first digital asset according to a first self-executing program requirement for the first blockchain action; determining a first plurality of locations of the first digital asset across the first network based on a mapping of the first network, wherein the mapping is based on an internal index, wherein the internal index comprises on-chain self-executing program characteristics and off-chain self-executing program characteristics, and wherein the on-chain self-executing program characteristics and off-chain self-executing program characteristics are archived in the internal index based on respective temporal identifiers; determining, based on the mapping, a first series of network connections to the first plurality of locations; and filtering the first series of network connections based on the first self-executing program requirement to determine a second plurality of self-executing programs; and performing the first blockchain action using the second plurality of self-executing programs.

35. A method for facilitating use of artificial intelligence platforms trained on blockchain action lineages to conduct blockchain actions, the method comprising: receiving a first self-executing program requirement for a requested blockchain action across a first network; determining a first feature input based on the first self-executing program requirement and the requested blockchain action; inputting the first feature input into an artificial intelligence model to generate a first output, wherein the artificial intelligence model is trained to generate predictions for performing blockchain actions on the first network by adjusting weights of the artificial intelligence model according to a first subset of blockchain action lineages used to conduct a first subset of blockchain actions, wherein the first subset of blockchain action lineages indicates self-executing program characteristics corresponding to each self-executing program of a first plurality of self-executing programs used to conduct one or more of the first subset of blockchain actions; and performing the requested blockchain action based on the first output.

36. The method of any one of the preceding embodiments, wherein performing the requested blockchain action based on the first output further comprises: based on the first output, determining a first blockchain lineage for performing the requested blockchain action; and using the first blockchain lineage to perform the requested blockchain action.

37. The method of any one of the preceding embodiments, wherein performing the requested blockchain action based on the first output further comprises: based on the first output, determining a second plurality of self-executing programs for use in performing the requested blockchain action; and using the second plurality of self-executing programs to perform the requested blockchain action.

38. The method of any one of the preceding embodiments, wherein performing the requested blockchain action based on the first output further comprises: based on the first output, determining a first self-executing program characteristic for performing the requested blockchain action; and using the first self-executing program characteristic to perform the requested blockchain action.

39. The method of any one of the preceding embodiments, wherein performing the requested blockchain action based on the first output further comprises: based on the first output, determining a first self-executing program for performing the requested blockchain action; and using the first self-executing program to perform the requested blockchain action.

40. The method of any one of the preceding embodiments, wherein performing the requested blockchain action based on the first output further comprises: based on the first output, determining a first plurality of locations across the first network for performing the requested blockchain action; and determining a first series of network connections to the first plurality of locations.

41. The method of any one of the preceding embodiments, wherein performing the requested blockchain action based on the first output further comprises: based on the first output, determining a first digital asset corresponding to the requested blockchain action; and executing the requested blockchain action on the first digital asset.

42. The method of any one of the preceding embodiments, wherein performing the requested blockchain action based on the first output further comprises: based on the first output, determining a first temporal identifier corresponding to performing the requested blockchain action; and using the first temporal identifier to perform the requested blockchain action.

43. The method of any one of the preceding embodiments, wherein performing the requested blockchain action based on the first output further comprises: based on the first output, predicting an availability of a first computer resource; and based on the availability, using the first computer resource to perform the requested blockchain action.

44. The method of any one of the preceding embodiments, wherein performing the requested blockchain action based on the first output further comprises: determining a type of the requested blockchain action; and based on the first output, determining whether to prioritize the requested blockchain action based on the type.

45. The method of any one of the preceding embodiments, wherein performing the requested blockchain action based on the first output further comprises: performing deep packet inspection of the requested blockchain action; and based on the deep packet inspection, determining whether to prioritize the requested blockchain action.

46. The method of any one of the preceding embodiments, wherein the artificial intelligence model is further trained to generate predictions for performing blockchain actions by: identifying a first cryptography-based storage application corresponding to one or more of the first subset of blockchain action lineages; and correlating the first cryptography-based storage application to a known entity.

47. The method of any one of the preceding embodiments, wherein the artificial intelligence model is further trained to generate predictions for performing blockchain actions by: determining a pattern corresponding to one or more of the first subset of blockchain action lineages; and determining an anomaly in the pattern.

48. The method of any one of the preceding embodiments, wherein performing the requested blockchain action based on the first output further comprises: based on the first output, determining a predicted blockchain action characteristic for the requested blockchain action; and comparing the predicted blockchain action characteristic to the first self-executing program requirement to determine whether to perform the requested blockchain action.

49. The method of any one of the preceding embodiments, wherein determining the first subset of blockchain action lineages used to conduct the first subset of blockchain actions further comprises determining a first blockchain action lineage by: determining a first self-executing program used to conduct a first blockchain action, wherein the first subset of blockchain actions comprises the first blockchain action; determining a second self-executing program used to conduct the first blockchain action, wherein the first subset of blockchain actions comprises the first blockchain action; determining a first self-executing program characteristic corresponding to the first self-executing program; and determining a second self-executing program characteristic corresponding to the second self-executing program.

50. The method of any one of the preceding embodiments, wherein determining the first feature input based on the first self-executing program requirement and the requested blockchain action further comprises: accessing an internal index, wherein the internal index comprises archived on-chain self-executing program characteristics and archived off-chain self-executing program characteristics, and wherein the archived on-chain self-executing program characteristics and the archived off-chain self-executing program characteristics are archived in the internal index based on respective temporal identifiers; generating, based on the internal index, a mapping of a first network, wherein the mapping indicates the archived on-chain self-executing program characteristics and the archived off-chain self-executing program characteristics corresponding to each self-executing program of a first plurality of self-executing programs; and including the first feature input in the mapping.

51. One or more non-transitory, machine-readable mediums storing instructions that, when executed by a data processing apparatus, cause the data processing apparatus to perform operations comprising those of any of embodiments 1-50.

52. A system comprising one or more processors; and memory storing instructions that, when executed by the processors, cause the processors to effectuate operations comprising those of any of embodiments 1-50.

53. A system comprising means for performing any of embodiments 1-50.

What is claimed is:

1. A system for facilitating use of artificial intelligence platforms trained on blockchain action lineages to conduct blockchain actions, the system comprising:
   one or more processors; and
   one or more non-transitory, computer-readable mediums comprising instructions recorded thereon on that, when executed by the one or more processors cause operations, comprise:
      accessing an internal index, wherein the internal index comprises on-chain self-executing program characteristics and off-chain self-executing program characteristics, and wherein the on-chain self-executing program characteristics and off-chain self-executing program characteristics are archived in the internal index based on respective temporal identifiers;
      generating, based on the internal index, a mapping of a first network;
   determining, based on the mapping, a first subset of blockchain action lineages used to conduct a first subset of blockchain actions, wherein the first subset of blockchain action lineages indicates self-executing program characteristics corresponding to each self-executing program of a first plurality of self-executing programs used to conduct one or more of the first subset of blockchain actions;
   generating, based on the first subset of blockchain action lineages, training data for an artificial intelligence platform that is trained to generate predictions for performing blockchain actions on the first network by adjusting weights of the artificial intelligence platform according to the training data;
   receiving a first self-executing program requirement for a requested blockchain action across the first network, wherein the first self-executing program requirement indicates a required security certificate for the requested blockchain action;

determining a first feature input based on the first self-executing program requirement and the requested blockchain action;

inputting the first feature input into the artificial intelligence platform to generate a first output, wherein the first output comprises a predicted security certificate for using a second plurality of self-executing programs to perform the requested blockchain action; and based on the first output, performing the requested blockchain action using the second plurality of self-executing programs.

2. A method for facilitating use of artificial intelligence platforms trained on blockchain action lineages to conduct blockchain actions, the method comprising:

receiving a first self-executing program requirement for a requested blockchain action across a first network;

determining a first feature input based on the first self-executing program requirement and the requested blockchain action using an internal index and a mapping of the first network, wherein the internal index comprises archived on-chain self-executing program characteristics and archived off-chain self-executing program characteristics, wherein the archived on-chain self-executing program characteristics and the archived off-chain self-executing program characteristics are archived in the internal index based on respective temporal identifiers, and wherein the mapping indicates the archived on-chain self-executing program characteristics and the archived off-chain self-executing program characteristics corresponding to each self-executing program of a first plurality of self-executing programs;

inputting the first feature input into an artificial intelligence model to generate a first output, wherein the artificial intelligence model is trained to generate predictions for performing blockchain actions on the first network by adjusting weights of the artificial intelligence model according to a first subset of blockchain action lineages used to conduct a first subset of blockchain actions, wherein the first subset of blockchain action lineages indicates self-executing program characteristics corresponding to each self-executing program of a first plurality of self-executing programs used to conduct one or more of the first subset of blockchain actions; and performing the requested blockchain action based on the first output.

3. The method of claim 2, wherein performing the requested blockchain action based on the first output further comprises:

based on the first output, determining a first blockchain lineage for performing the requested blockchain action; and using the first blockchain lineage to perform the requested blockchain action.

4. The method of claim 2, wherein performing the requested blockchain action based on the first output further comprises:

based on the first output, determining a second plurality of self-executing programs for use in performing the requested blockchain action; and using the second plurality of self-executing programs to perform the requested blockchain action.

5. The method of claim 2, wherein performing the requested blockchain action based on the first output further comprises:

based on the first output, determining a first self-executing program characteristic for performing the requested blockchain action; and using the first self-executing program characteristic to perform the requested blockchain action.

6. The method of claim 2, wherein performing the requested blockchain action based on the first output further comprises:

based on the first output, determining a first self-executing program for performing the requested blockchain action; and using the first self-executing program to perform the requested blockchain action.

7. The method of claim 2, wherein performing the requested blockchain action based on the first output further comprises:

based on the first output, determining a first plurality of locations across the first network for performing the requested blockchain action; and determining a first series of network connections to the first plurality of locations.

8. The method of claim 2, wherein performing the requested blockchain action based on the first output further comprises:

based on the first output, determining a first digital asset corresponding to the requested blockchain action; and executing the requested blockchain action on the first digital asset.

9. The method of claim 2, wherein performing the requested blockchain action based on the first output further comprises:

based on the first output, determining a first temporal identifier corresponding to performing the requested blockchain action; and using the first temporal identifier to perform the requested blockchain action.

10. The method of claim 2, wherein performing the requested blockchain action based on the first output further comprises:

based on the first output, predicting an availability of a first computer resource; and based on the availability, using the first computer resource to perform the requested blockchain action.

11. The method of claim 2, wherein performing the requested blockchain action based on the first output further comprises:

determining a type of the requested blockchain action; and based on the first output, determining whether to prioritize the requested blockchain action based on the type.

12. The method of claim 2, wherein performing the requested blockchain action based on the first output further comprises:

performing deep packet inspection of the requested blockchain action; and based on the deep packet inspection, determining whether to prioritize the requested blockchain action.

13. The method of claim 2, wherein the artificial intelligence model is further trained to generate predictions for performing blockchain actions by:

identifying a first cryptography-based storage application corresponding to one or more of the first subset of blockchain action lineages; and correlating the first cryptography-based storage application to a known entity.

14. The method of claim 2, wherein the artificial intelligence model is further trained to generate predictions for performing blockchain actions by:
  determining a pattern corresponding to one or more of the first subset of blockchain action lineages; and
  determining an anomaly in the pattern.

15. The method of claim 2, wherein performing the requested blockchain action based on the first output further comprises:
  based on the first output, determining a predicted blockchain action characteristic for the requested blockchain action; and
  comparing the predicted blockchain action characteristic to the first self-executing program requirement to determine whether to perform the requested blockchain action.

16. The method of claim 2, wherein determining the first subset of blockchain action lineages used to conduct the first subset of blockchain actions further comprises determining a first blockchain action lineage by:
  determining a first self-executing program used to conduct a first blockchain action, wherein the first subset of blockchain actions comprises the first blockchain action;
  determining a second self-executing program used to conduct the first blockchain action, wherein the first subset of blockchain actions comprises the first blockchain action;
  determining a first self-executing program characteristic corresponding to the first self-executing program; and
  determining a second self-executing program characteristic corresponding to the second self-executing program.

17. One or more non-transitory, computer-readable mediums comprising instructions recorded thereon on that, when executed by one or more processors, cause operations comprising:
  receiving a first self-executing program requirement for a requested blockchain action across a first network;
  determining a first feature input based on the first self-executing program requirement and the requested blockchain action using an internal index and a mapping of the first network, wherein the internal index comprises archived on-chain self-executing program characteristics and archived off-chain self-executing program characteristics, wherein the archived on-chain self-executing program characteristics and the archived off-chain self-executing program characteristics are archived in the internal index based on respective temporal identifiers, and wherein the mapping indicates the archived on-chain self-executing program characteristics and the archived off-chain self-executing program characteristics corresponding to each self-executing program of a first plurality of self-executing programs;
  inputting the first feature input into an artificial intelligence model to generate a first output, wherein the artificial intelligence model is trained to generate predictions for performing blockchain actions on the first network by adjusting weights of the artificial intelligence model according to a first subset of blockchain action lineages used to conduct a first subset of blockchain actions, wherein the first subset of blockchain action lineages indicates self-executing program characteristics corresponding to each self-executing program of a first plurality of self-executing programs used to conduct one or more of the first subset of blockchain actions;
  performing the requested blockchain action based on the first output; and
  generating for display, on a user interface, a confirmation of the requested blockchain action being performed.

18. The one or more non-transitory, computer-readable mediums of claim 17, wherein performing the requested blockchain action based on the first output further comprises:
  based on the first output, determining a first blockchain lineage for performing the requested blockchain action; and
  using the first blockchain lineage to perform the requested blockchain action.

19. The one or more non-transitory, computer-readable mediums of claim 17, wherein performing the requested blockchain action based on the first output further comprises:
  based on the first output, determining a second plurality of self-executing programs for use in performing the requested blockchain action; and
  using the second plurality of self-executing programs to perform the requested blockchain action.

* * * * *